US008184947B2

(12) United States Patent
Murabayashi et al.

(10) Patent No.: US 8,184,947 B2
(45) Date of Patent: May 22, 2012

(54) ELECTRONIC APPARATUS, CONTENT CATEGORIZING METHOD, AND PROGRAM THEREFOR

(75) Inventors: Noboru Murabayashi, Saitama (JP); Hiroshige Okamoto, Kanagawa (JP)

(73) Assignee: Sony Corporation (JP)

( * ) Notice: Subject to any disclaimer, the term of this patent is extended or adjusted under 35 U.S.C. 154(b) by 835 days.

(21) Appl. No.: 12/287,294

(22) Filed: Oct. 8, 2008

(65) Prior Publication Data

US 2009/0103888 A1    Apr. 23, 2009

(30) Foreign Application Priority Data

Oct. 17, 2007  (JP) ................ P2007-270643

(51) Int. Cl.
*H04N 9/80* (2006.01)
(52) U.S. Cl. .............. 386/242; 386/231; 386/248
(58) Field of Classification Search .......... 386/248, 386/231, 242
See application file for complete search history.

(56) References Cited

U.S. PATENT DOCUMENTS

| 7,110,454 B1 * | 9/2006 | Chakraborty ............ 375/240.16 |
| 2004/0223052 A1 * | 11/2004 | Sugano et al. .................. 348/70 |

FOREIGN PATENT DOCUMENTS

| JP | 2003-061027 A | 2/2003 |
| JP | 2004-128550 A | 4/2004 |
| JP | 2007-141380 A | 6/2007 |

* cited by examiner

*Primary Examiner* — Thai Tran
*Assistant Examiner* — Girumsew Wendmagegn
(74) *Attorney, Agent, or Firm* — Lerner, David, Littenberg, Krumholz & Mentlik, LLP

(57) ABSTRACT

An electronic apparatus includes a detecting unit and a categorizing unit. The detecting unit compares each of a plurality of frames that constitute each of a plurality of video contents with one another, and detects a video feature generated by one of a camera operation and video editing from each of the plurality of video contents. The categorizing unit judges, based on the detected video feature, a visual activity level of a video contained in each of the plurality of video contents, and categorizes each of the plurality of video contents based on the judged activity level.

11 Claims, 28 Drawing Sheets

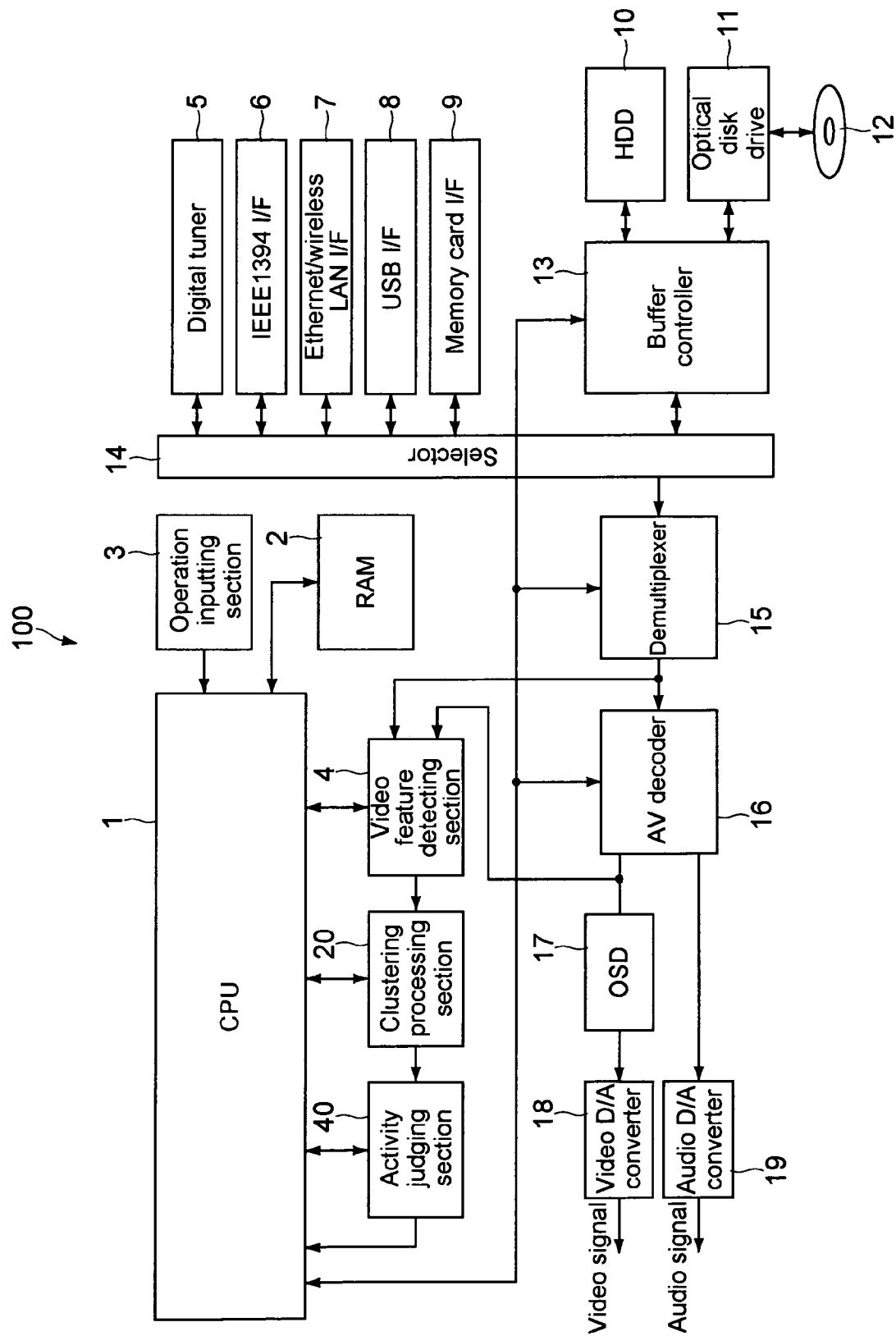

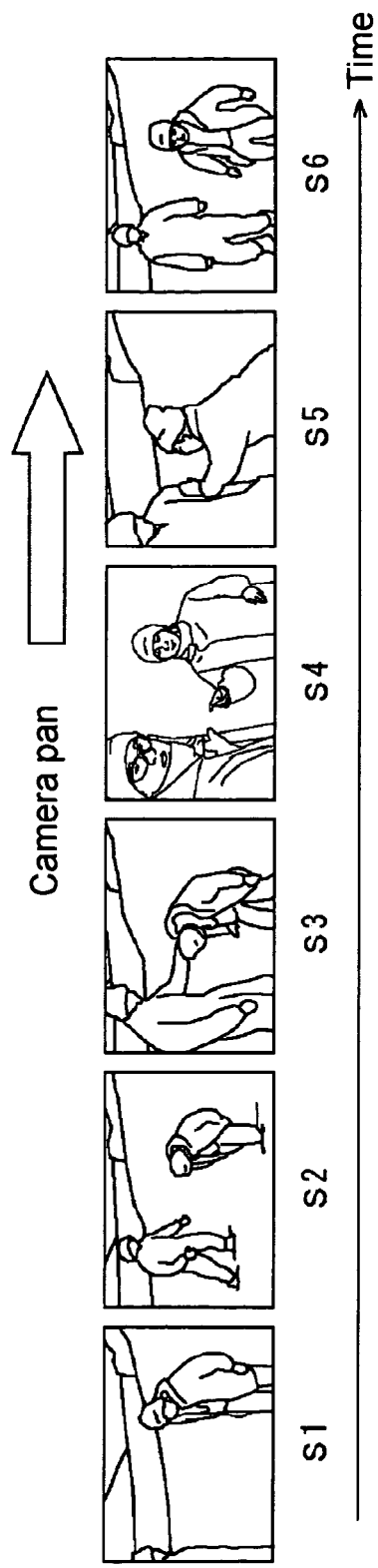
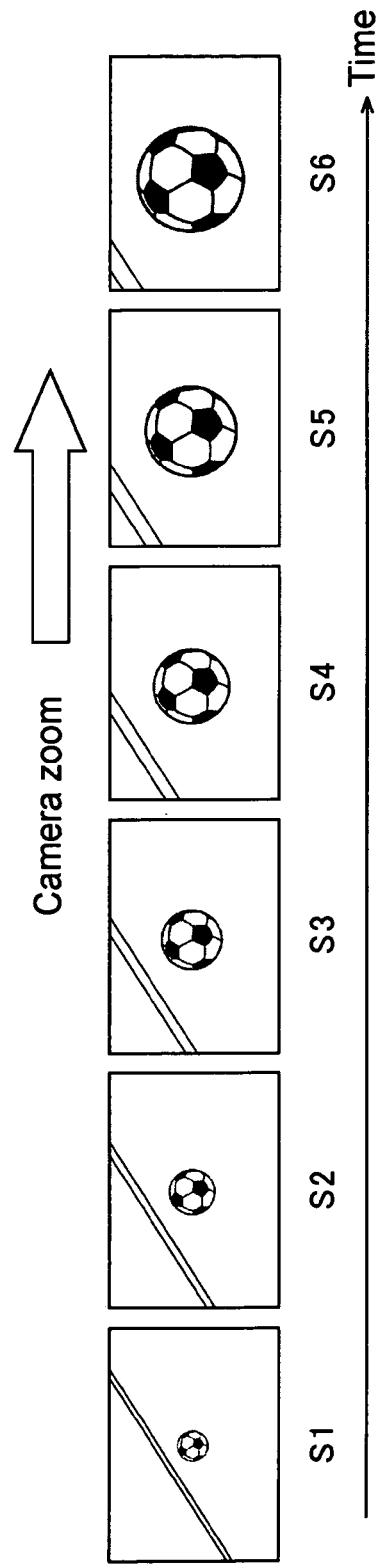
FIG.2A
FIG.2B

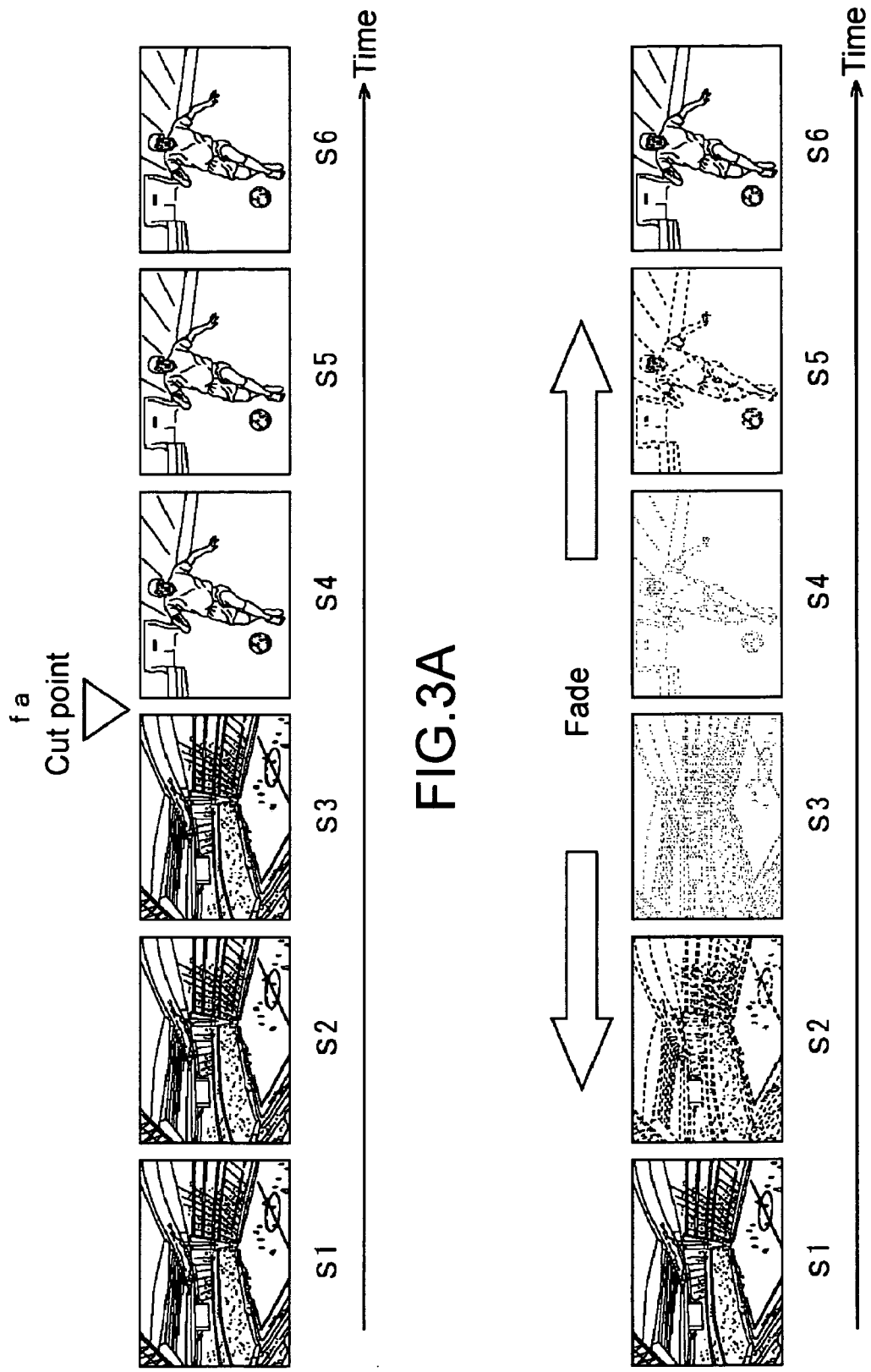

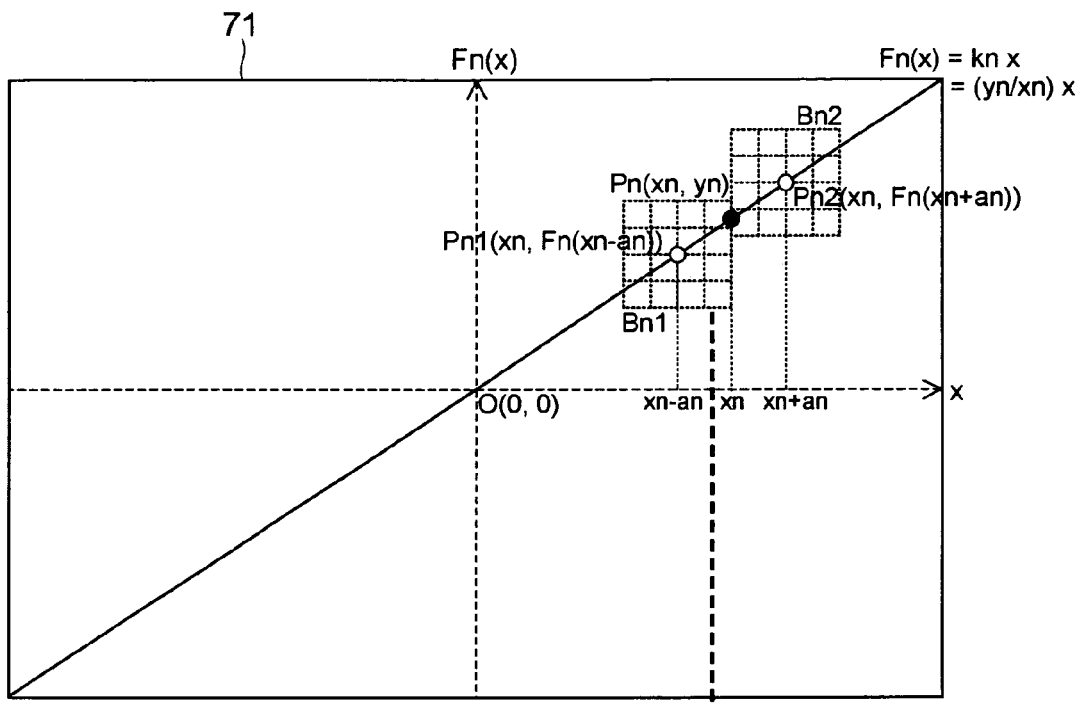
FIG.16A
FIG.16B
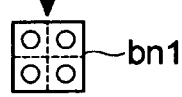
FIG.16C $$\begin{bmatrix} x \\ y \end{bmatrix} = \begin{pmatrix} \cos\theta & \sin\theta \\ -\sin\theta & \cos\theta \end{pmatrix} \begin{pmatrix} Zx & 0 \\ 0 & Zy \end{pmatrix} \begin{bmatrix} x0 \\ y0 \end{bmatrix} + \begin{bmatrix} Px \\ Py \end{bmatrix}$$

$$\fallingdotseq \begin{pmatrix} 1 & \theta \\ -\theta & 1 \end{pmatrix} \begin{pmatrix} Zx & 0 \\ 0 & Zy \end{pmatrix} \begin{bmatrix} x0 \\ y0 \end{bmatrix} + \begin{bmatrix} Px \\ Py \end{bmatrix}$$

$$= \begin{pmatrix} Zx & \theta Zy \\ -\theta Zx & Zy \end{pmatrix} \begin{bmatrix} x0 \\ x0 \end{bmatrix} + \begin{bmatrix} Px \\ Py \end{bmatrix}$$

$$= \begin{pmatrix} Zx\,x0 + \theta Zy\,y0 + Px \\ -\theta Zx\,x0 + Zy\,y0 + Px \end{pmatrix}$$

$$= \begin{pmatrix} a0 + a1\,x0 + a2\,y0 \\ b0 + b1\,x0 + b2\,y0 \end{pmatrix}$$

$a0 = Px$      $b0 = Py$ $a1 = Zx$      $b1 = \theta Zx = -a1\,\theta$ $a2 = \theta Zy = b2\,\theta$      $b2 = Zy$

FIG.20

$$\begin{bmatrix} xm \\ ym \end{bmatrix} = \begin{pmatrix} a0 + a1\,xn + a2\,yn \\ b0 + b1\,yn + b2\,yn \end{pmatrix}$$

(n=0, 1, 2, 3, 4, 5, ······, nmax) mmax=63

Explanatory variable
    xn : x coordinate of detecting target point Pn
    yn : y coordinate of detecting target point Pn Explained variable
    xm : x coordinate of detection position Pm
    ym : y coordinate of detection position Pm

FIG.21

| Judging feature type | Dpan | | Dtilt | | Dzoom | | Dbure | | Dcut | | Dfade | |
|---|---|---|---|---|---|---|---|---|---|---|---|---|
| | 0 | 1 | 0 | 1 | 0 | 1 | 0 | 1 | 0 | 1 | 0 | 1 |
| Pan | | O | | | | | | | | | | |
| Tilt | | | | O | | | | | | | | |
| Zoom | | | | | | O | | | | | | |
| Shake | | | | | | | | O | | | | |
| Cut | | | | | | | | | | O | | |
| Fade | | | | | | | | | | | | O |

FIG.25

ELECTRONIC APPARATUS, CONTENT CATEGORIZING METHOD, AND PROGRAM THEREFOR

CROSS REFERENCES TO RELATED APPLICATIONS

The present application claims priority from Japanese Patent Application JP No. 2007-270643 filed in the Japanese Patent Office on Oct. 17, 2007, the entire content of which is incorporated herein by reference.

BACKGROUND OF THE INVENTION

1. Field of the Invention

The present invention relates to an electronic apparatus capable of categorizing a plurality of video contents, a content categorizing method in the electronic apparatus, and a program therefore.

2. Description of the Related Art

In recent years, electronic apparatuses having large-capacity storage media have prevailed, and it has become possible to store various video contents in the electronic apparatuses. Further, prevalence of the Internet has enabled a plurality of users to post images and video contents on a website so that others can download and reproduce them for entertainment.

Incidentally, contents of such a large amount of video contents are diversified. Although websites or the like that allow a certain degree of genre categorization exist, categorization thereof is insufficient. Therefore, there are times when a user realizes that a video content that a user has desirably downloaded after selecting it from a large amount of choices is quite boring after the video content has been downloaded, the circumstances of which can hardly be said to allow the user to enjoy effective reproduction of video contents.

Thus, as a technique of categorizing video contents, Japanese Patent Application Laid-open No. 2003-61027 (FIG. 5 etc.) (hereinafter, referred to as Patent Document 1) discloses an apparatus capable of storing an attribute table for categorizing video contents in accordance with histograms of colors of images constituting each of the video contents, or waveforms and frequency characteristics of audio constituting each of the video contents, and categorizing the video contents based on the attribute table.

SUMMARY OF THE INVENTION

However, in the technique disclosed in Patent Document 1 above, a data amount of the attribute table used for matching an attribute of a video content as a categorization target with color and audio becomes gigantic, resulting in an increase in load of the apparatus. Moreover, the apparatus may mistakingly categorize the video contents into the same category even when contents thereof are totally different in a case where only the color and audio are used for the matching. Further, even when the apparatus categorizes the video contents in accordance with color and audio, it is difficult to effectively present to users what kind of contents are contained in the respective video contents belonging to the certain category.

Incidentally, there may be users who use as indices his/her states of mind, such as an exalted state of mind and a calm state of mind, in selecting and viewing a video content. For example, users in an exalted state of mind may wish to view a video content that is rushing or has a sense of speed, whereas users in a calm and relaxed state of mind may wish to view a video content that is less rushing and is relaxing. In addition, users who are in a depressed state of mind or feeling stress may wish to view a rushing video content for energizing themselves and releasing stresses, or on the contrary, may wish to view a relaxing video content to soothe themselves. Therefore, there is demanded a technique for categorizing video contents so that users can select a video content based on his/her states of mind.

In view of the above circumstances, there is a need for an electronic apparatus, a content categorizing method, and a program therefore that are capable of appropriately categorizing a large amount of video contents so that a user can select a video content in accordance with his/her state of mind for entertainment.

According to an embodiment of the present invention, there is provided an electronic apparatus including a detecting means and a categorizing means. The detecting means compares each of a plurality of frames that constitute each of a plurality of video contents with one another, and detects a video feature generated by one of a camera operation and video editing from each of the plurality of video contents. The categorizing means judges, based on the detected video feature, a visual activity level of a video contained in each of the plurality of video contents, and categorizes each of the plurality of video contents based on the judged activity level.

Here, the electronic apparatus refers to various electric appliances such as a recording/reproducing apparatus including HDD/DVD/BD recorders, a personal computer (PC), a server apparatus, a television apparatus, a game machine, a digital camera, a digital video camera, and a cellular phone. Further, the video feature refers to, for example, a video feature caused when operating a camera, such as pan, tilt, and zoom and a video feature caused while editing a video, such as fade and cut. Moreover, the visual activity level indicates, for example, when a magnitude of motions and speed of an object (person or thing) within a video content, a scene switching frequency, and the like are referred to as an "activity", a degree of activity within the video content. Furthermore, the term "categorize" used herein includes not only a concept of (discretely) distributing the video contents into a plurality of groups, but also a concept of distributing the video contents while keeping them distinguishable from one another based on activity levels thereof.

With this structure, the video contents can be categorized in accordance with the visual activity levels thereof. Therefore, the user becomes capable of selecting to view, from among a large amount of video contents, a desired content that matches his/her state of mind, such as an exalted state of mind and a calm state of mind, using the visual activity levels as indices, resulting in enhancement in convenience.

In the electronic apparatus according to the embodiment of the present invention, the detecting means may be capable of detecting a plurality of kinds of video features, and the categorizing means may include a selecting means for selecting, from among the plurality of kinds of video features, at least one kind of video feature to be set as a basis for judging the activity level, and a judging means for judging the activity level of each of the plurality of video contents based on the selected video feature.

Accordingly, by selecting the video feature to be the basis for judgment of activity levels from the plurality of video features, the activity level can be judged with higher precision and the video contents can be categorized more precisely.

In the electronic apparatus according to the embodiment of the present invention, the selecting means may include a learning means for categorizing, for each of the plurality of kinds of video features, first video contents from among the plurality of video contents into a predetermined number of groups, and learning the video feature to be selected based on a ratio of the number of categorized first video contents contained in each of the predetermined number of groups. In addition, the judging means may judge, from among the plurality of video contents, the activity level of second video contents other than the first video contents based on the selected video feature.

Accordingly, by determining whether the first video contents have been uniformly categorized into the plurality of groups, learning of an optimal video feature to be used in judging the activity level of the second video contents becomes possible, and precision in judging the activity level can be additionally improved. It should be noted that a data clustering method such as a K-means method and a fuzzy C-means method, or a categorizing method such as a decision tree can be used as the learning means.

In the electronic apparatus according to the embodiment of the present invention, the detecting means may detect each of the plurality of kinds of video features as a predetermined feature value, and the judging means may generate a predetermined discriminant function for discriminating, using the feature value of the video feature selected as a result of the learning as a variable, the second video contents between a video content whose activity level is high and a video content whose activity level is low, and judge the activity level based on a value of the discriminant function.

Accordingly, by carrying out a discrimination analysis using the generated discriminant function, the activity level can be calculated in analogue as a value of the discriminant function. Therefore, the video contents can be categorized more specifically and a selection range of the user can be widened.

Further, in this case, in the electronic apparatus according to the embodiment of the present invention, the judging means may categorize the second video contents into a plurality of levels in accordance with which of a positive value and a negative value the value of the discriminant function is and whether an absolute value of the value of the discriminant function exceeds at least one predetermined threshold.

Accordingly, no matter what the number of groups categorized by the learning means is, it is possible to categorize the video contents stepwise.

The electronic apparatus according to the embodiment of the present invention may further include a storing means and an outputting means. The storing means stores each of the plurality of video contents together with the judged activity level thereof. The outputting means outputs a signal for displaying a content list for inputting reproduction of each of the plurality of stored video contents together with identification information for identifying the judged activity level of each of the plurality of video contents.

Accordingly, the user can select and reproduce a desired video content from the content list while using the identification information indicating the activity levels as indices. It should be noted that the expression "outputs a signal for displaying" conceptually includes, in addition to a case where the electronic apparatus causes a display unit included in the electronic apparatus to display the content list, a case where the electronic apparatus causes a display apparatus externally connected thereto to display the content list. Moreover, in a case where the electronic apparatus is constituted as a web server, the processing to "output a signal for displaying" includes processing of transmitting a web page so that the content list is displayed on a browser run on a client apparatus such as a PC connected to the web server. Further, in a case where the electronic apparatus functions as the web server, the processing includes displaying, by the browser installed in an apparatus such as a PC on the user side, the content list on a display apparatus included in the user apparatus or connected thereto. Furthermore, the identification information is image information, character information, and the like. The content list may be displayed as a list of thumbnail images of the video contents.

In this case, in the electronic apparatus according to the embodiment of the present invention, the signal output by the outputting means may cause a predetermined symbol in a number corresponding to the activity level to be displayed as the identification information.

Here, the predetermined symbol refers to symbols of a variety of shapes including, for example, a star, a circle, and a rectangle. Accordingly, it becomes possible to present to the user the activity level of the video contents in an easy-to-understand manner.

Further, in this case, in the electronic apparatus according to the embodiment of the present invention, the signal output by the outputting means may cause an image indicating a ratio of the activity level with respect to a maximum activity level to be displayed as the identification information.

Here, the image indicating the ratio is displayed as a bar graph or a pie chart, for example. Accordingly, the activity level of the video contents can be presented more specifically.

Further, in the electronic apparatus according to the embodiment of the present invention, the signal output by the outputting means may cause a thumbnail image showing each of the plurality of video contents in a reproducible state to be displayed as the identification information while changing a contrast of the thumbnail image in accordance with the activity level of each of the plurality of video contents.

In this case, the thumbnail image of the video contents whose activity level is high may be displayed to be brighter than that of the video contents whose activity level is low, or the thumbnail image of the video contents whose activity level is low may be displayed to be brighter than that of the video contents whose activity level is high. Moreover, the activity levels may be displayed while differentiating a color of frame portions of the thumbnail images in accordance with the activity levels, for example.

The electronic apparatus according to the embodiment of the present invention may further include a retrieving means for retrieving a video content having a predetermined activity level. In the electronic apparatus, the signal output by the outputting means may cause the content list of video contents having the predetermined activity level and the identification information thereof to be displayed as a result of the retrieval.

Accordingly, it becomes possible to retrieve a video content using the activity level as a retrieval condition. For example, it is possible to cause the user to select the activity level to thus extract and display the video content according to the selected activity level.

According to another embodiment of the present invention, there is provided a content categorizing method including: comparing each of a plurality of frames that constitute each of a plurality of video contents with one another, and detecting a video feature generated by one of a camera operation and video editing from each of the plurality of video contents; and judging, based on the detected video feature, a visual activity level of a video contained in each of the plurality of video contents, and categorizing each of the plurality of video contents based on the judged activity level.

According to another embodiment of the present invention, there is provided a program for causing an electronic apparatus to execute the steps of: comparing each of a plurality of frames that constitute each of a plurality of video contents with one another, and detecting a video feature generated by one of a camera operation and video editing from each of the plurality of video contents; and judging, based on the detected video feature, a visual activity level of a video contained in each of the plurality of video contents, and categorizing each of the plurality of video contents based on the judged activity level.

According to another embodiment of the present invention, there is provided an electronic apparatus including a detecting unit and a categorizing unit. The detecting unit compares each of a plurality of frames that constitute each of a plurality of video contents with one another, and detects a video feature generated by one of a camera operation and video editing from each of the plurality of video contents. The categorizing unit judges, based on the detected video feature, a visual activity level of a video contained in each of the plurality of video contents, and categorizes each of the plurality of video contents based on the judged activity level.

As described above, according to the embodiments of the present invention, a large amount of video contents can be categorized appropriately so as to be selectable in accordance with a user's state of mind.

These and other objects, features and advantages of the present invention will become more apparent in light of the following detailed description of best mode embodiments thereof, as illustrated in the accompanying drawings.

BRIEF DESCRIPTION OF DRAWINGS

FIG. 1 is a diagram showing a structure of a recording/reproducing apparatus according to an embodiment of the present invention;

FIG. 2 are diagrams each showing a camera operational feature according to the embodiment of the present invention;

FIG. 3 are diagrams each showing a video editorial feature according to the embodiment of the present invention;

FIG. 16 are diagrams showing a basis block setting method in the block-matching processing according to the embodiment of the present invention;

FIG. 20 shows an affine transformation model according to the embodiment of the present invention;

FIG. 21 illustrates multiple regression analyzing processing according to the embodiment of the present invention;

FIG. 25 is a table showing judgment results of video features according to the embodiment of the present invention;

DESCRIPTION OF PREFERRED EMBODIMENTS

Figure 4A:
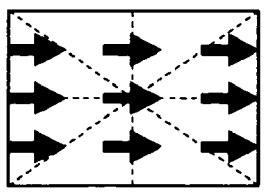
FIG. 4 are diagrams each schematically showing the camera operational feature according to the embodiment of the present invention.

Hereinafter, embodiments of the present invention will be described with reference to the drawings.

FIG. 1 is a diagram showing a structure of a recording/reproducing apparatus 100 according to an embodiment of the present invention.

As shown in the figure, the recording/reproducing apparatus 100 includes a CPU (Central Processing Unit) 1, a RAM (Random Access Memory) 2, an operation inputting section 3, a video feature detecting section 4, a clustering processing section 20, an activity judging section 40, a digital tuner 5, an IEEE1394 interface 6, an Ethernet (registered trademark)/wireless LAN (Local Area Network) interface 7, a USB (Universal Serial Bus) interface 8, a memory card interface 9, an HDD (Hard Disk Drive) 10, an optical disk drive 11, a buffer controller 13, a selector 14, a demultiplexer 15, an AV (Audio/Video) decoder 16, an OSD (On-Screen Display) 17, a video D/A (Digital/Analog) converter 18, and an audio D/A converter 19.

The CPU 1 arbitrarily accesses the RAM 2 or the like when necessary to control entire blocks of the recording/reproducing apparatus 100. The RAM 2 is used as a working area of the CPU 1 and the like, and temporarily stores an OS (Operating System), programs, processing data, and the like.

The operation inputting section 3 is composed of, for example, a button, a switch, a key, a touch panel, or a light receiving section for receiving infrared-ray signals transmitted from a remote controller (not shown), and inputs various setting values and instructions made by an operation of a user and outputs the values and instructions to the CPU 1.

Under control of the CPU 1, the digital tuner 5 receives a broadcast signal of a broadcast program in digital broadcast via an antenna (not shown) and tunes in and demodulates the broadcast signal of a specific channel. The broadcast signal is output to the demultiplexer 15 via the selector 14 to be reproduced, recorded onto the HDD 10 via the buffer controller 13, or recorded onto an optical disk 12 inserted into the optical disk drive 11.

The IEEE1394 interface 6 is connectable to an external device such as a digital video camera. For example, a video content shot and recorded by the digital video camera is reproduced or recorded onto the HDD 10 or the optical disk 12 as in the case of a video content of the broadcast program received by the digital tuner 5.

The Ethernet (registered trademark)/wireless LAN interface 7 is used to, for example, input a video content recorded by a PC or another recording/reproducing apparatus using the Ethernet (registered trademark) or a wireless LAN. The video content in this case is also capable of being reproduced or recorded onto the HDD 10 or the optical disk 12.

The USB interface 8 is used to input, via a USB, the video content from devices such as a digital camera and an external storage apparatus such as a so-called USB memory, for example. The video content in this case is also capable of being reproduced or recorded onto the HDD 10 or the optical disk 12.

The memory card interface 9 is connected to a memory card with a built-in flash memory, and is used to input the video content recorded in the memory card, for example. The video content in this case is also capable of being reproduced or recorded onto the HDD 10 or the optical disk 12.

The HDD 10 records various video contents received as broadcast signals or input from the external device onto a built-in hard disk, and reads out those video contents from the hard disk at a time of reproduction thereof to output the data to the buffer controller 13. Further, the HDD 10 also stores an OS, programs for executing video feature detecting processing, clustering processing, and activity judging processing with respect to a video content, all of which will be described later, and other various programs, data, and the like. It should be noted that the recording/reproducing apparatus 100 may store the OS or various programs and data in other storage media such as a flash memory (not shown) instead of the HDD 10.

The optical disk drive 11 records the video content and the like onto the optical disk 12, and reads out the video content and the like at the time of reproduction thereof to output the data to the buffer controller 13. The optical disk 12 is, for example, a DVD (Digital Versatile Disk), a BD (Blu-ray disk), and a CD (Compact Disk).

The buffer controller 13 controls write timings and data amounts of the video contents that are successively supplied from the digital tuner 5 or various other interfaces, with respect to the HDD 10 or the optical disk 12, and intermittently writes the video contents in the HDD 10 or the optical disk 12, for example. Further, the buffer controller 13 controls read timings and data amounts of the video contents recorded onto the HDD 10 or the optical disk 12, and supplies the intermittently read-out video contents successively to the demultiplexer 15.

The selector 14 selects, based on a control signal from the CPU 1, the video content input from any of the digital tuner 5, the various interfaces, the HDD 10, and the optical disk drive 11.

The demultiplexer 15 separates the multiplexed video content input from the buffer controller 13 into a video signal and an audio signal, and outputs those signals to the AV decoder 16.

The AV decoder 16 decodes the encoded video signal and audio signal in, for example, an MPEG (Moving Picture Expert Group)-2 format or an MPEG-4 format, and outputs the video signal to the OSD 17 and the audio signal to the audio D/A converter 19.

The OSD 17 generates a graphic and the like to be displayed on a display (not shown) and subjects the generated graphic and the like to synthesizing processing or switching processing with the video signal. After that, the OSD 17 outputs the processed video signal to the video D/A converter 18. The video D/A converter 18 converts the video signal subjected to the graphic processing by the OSD 17 from a digital signal to an analog signal to obtain an NTSC (National Television Standards Committee) signal, and outputs the converted signal to the display (not shown) for display.

The audio D/A converter 19 converts an audio signal input from the AV decoder 16 from a digital signal to an analog signal, and outputs the converted signal to a speaker (not shown) for reproduction thereof.

The video feature detecting section 4 detects a video feature from a video signal not yet decoded by the AV decoder 16 or that has been decoded by the AV decoder 16.

The clustering processing section 20 categorizes, from among video contents from which the video features have been detected, learning video contents into a predetermined number of clusters based on the video features. Details of the clustering processing will be described later.

Based on the result of the learning, that is, the result of the clustering processing, the activity judging section 40 judges a visual activity (activity level) of the video contents. The activity used herein indicates, for example, when a magnitude of motions and speed of an object (person or thing) within a video content, a scene switching frequency, and the like are referred to as an "activity", a degree of activity within the video content. Details of the activity judging processing will be described later.

FIGS. 2 and 3 are diagrams illustrating the video features.

FIG. 2A shows a video containing Scenes S1 to S6 and shot while moving (panning) a camera in a left- or right-hand direction starting from Scene S1. FIG. 2B shows a video containing Scenes S1 to S6 and shot while the camera is zooming in starting from Scene S1. In this embodiment, the video feature caused by camera works such as pan, tilt (not shown), and zoom is referred to as camera operational feature.

FIG. 3A shows a state where a scene is switched from Scene S3 to Scene S4 at a cut point fa provided therebetween.

FIG. 3B shows a state where a scene gradually fades out as represented sequentially by Scenes S1 to S3 and another scene gradually fades in as represented sequentially by Scenes S4 to S6. In this embodiment, a video feature caused while editing a video such as a video effect including cut and fade is referred to as video editorial feature.

The video feature detecting section 4 detects such a camera operational feature and video editorial feature by a common signal processing system to be described later. The clustering processing section 20 and the activity judging section 40 use the detected video features to judge the activity of the video contents and categorize the video contents based on the activity thereof. It should be noted that the recording/reproducing apparatus 100 may use the detected video features to carry out processing such as highlight scene generation and chapter generation.

FIG. 4 are diagrams each schematically showing the camera operational feature.

FIG. 4A shows a leftward pan. In this case, an object in the video moves in the right-hand direction.

Figure 4B:
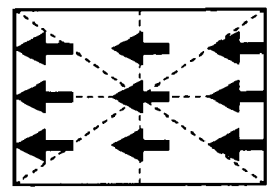

FIG. 4B shows a rightward pan. In this case, the object in the video moves in the left-hand direction.

Figure 4C:
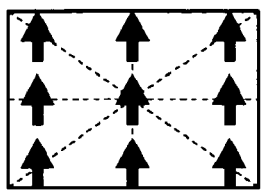

FIG. 4C shows a downward tilt. In this case, the object in the video moves upward.

Figure 4D:
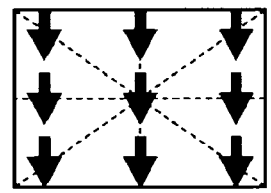

FIG. 4D shows an upward tilt. In this case, the object in the video moves downward.

Figure 4E:
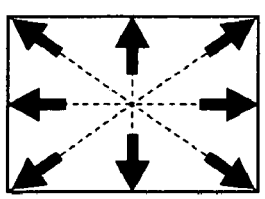

FIG. 4E shows zoom-in. In this case, the object in the video is enlarged.

Figure 4F:
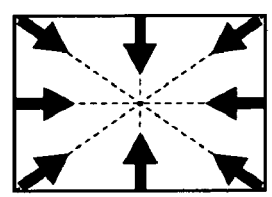

FIG. 4F shows zoom-out. In this case, the object in the video is shrunk.

Figure 5:
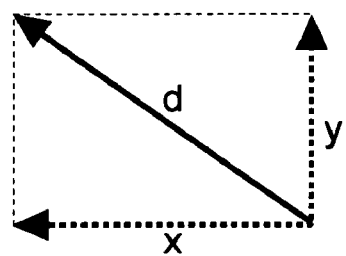
FIG. 5 is a diagram schematically showing change amounts of an image in zooming according to the embodiment of the present invention.

FIG. 5 is a diagram schematically showing change amounts of an image in zooming.

To detect the camera operational feature in the video content, it is necessary to detect a motion vector in the video content using block matching. However, as shown in FIG. 4, because a movement amount of a zoomed image is smaller than that of a panned image or a tilted image, a detection level thereof is also considered to be small. Therefore, when carrying out the block matching using a single block as in the related art, the zoom may not be detected, thus causing erroneous detection. Thus, this embodiment carries out the block matching using a combination of a plurality of blocks.

Here, as indicated by an arrow d of FIG. 5, a change of the image in zooming is a change in a radial direction (oblique direction). Thus, when the change amount thereof is projected in X and Y directions, change amounts respectively indicated by arrows x and y are both smaller than the original change amount in the radial direction. Therefore, erroneous detection in the block matching is considered to be suppressed more in the block matching using a combination of a certain block and another block arranged in the radial direction than the block matching using a combination of the certain block and another block arranged in the X or Y direction. Accordingly, in this embodiment, the video feature detecting section 4 carries out the block matching using a combination of blocks arranged in the radial direction, specific processing of which will be described later.

Incidentally, recent home video cameras are often equipped with a so-called shake correcting function. However, a correction amount of the shake correcting function is limited, with the result that the video content shot by the home video camera is highly likely to more or less contain a shaking picture. Further, in actuality, the inventors of the present invention experimentally compared a video shot with the home video camera and a video shot in a studio, such as a broadcast program, and found that vibration amounts of motion vectors in both videos largely differ from each other.

Figure 6:
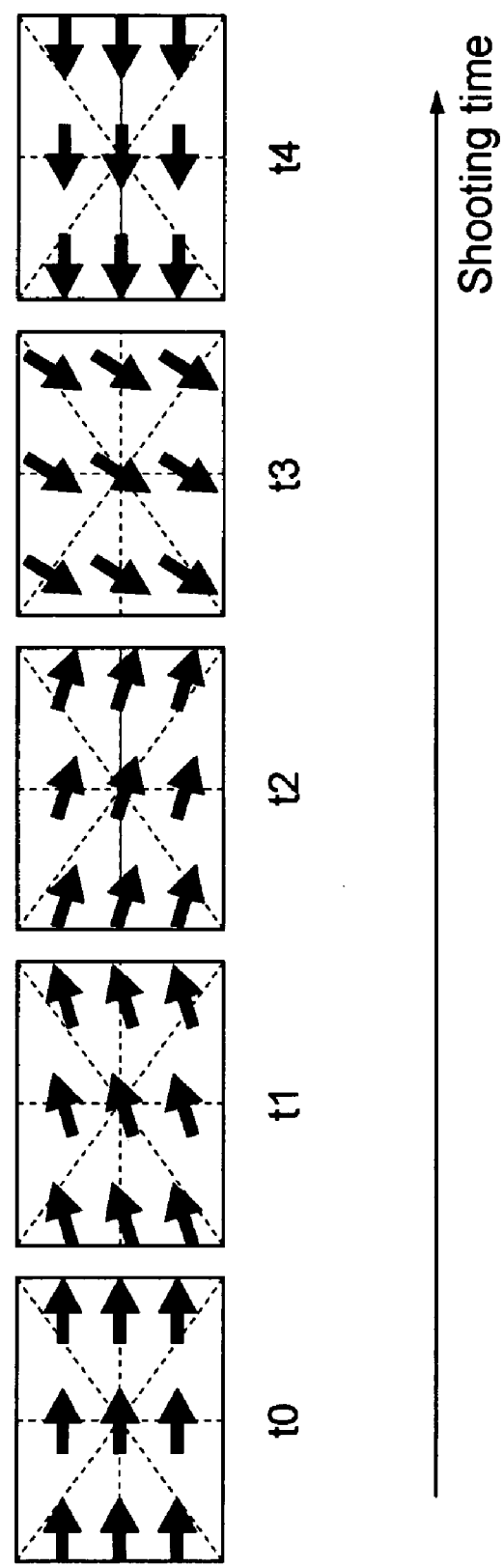
FIG. 6 is a diagram schematically showing a shaking picture caused by a hand movement according to the embodiment of the present invention.

FIG. 6 is a diagram schematically showing a shaking picture based on the experimental result. As shown in the figure, the shaking picture is randomly caused of pan and tilt in frame units. Therefore, a shake caused by a hand movement can be detected by detecting a time-series behavioral change of pan and tilt in a predetermined section within the video content, that is, a time-series behavioral change of motion vectors.

Thus, by detecting presence or absence of a shaking picture or an occurrence frequency thereof, it becomes possible to distinguish the video content recorded with a broadcast content from the video content shot with the home video camera. The recording/reproducing apparatus 100 is assumed to store therein a variety of multimedia contents, so distinguishing the video contents from one another is considered extremely effective in, for example, organizing the video contents. Thus, in this embodiment, the video feature detecting section 4 detects not only the pan, tilt, and zoom, but also the shake caused by a hand movement as the camera operational feature, specific processing of which will be described later.

Figure 7:
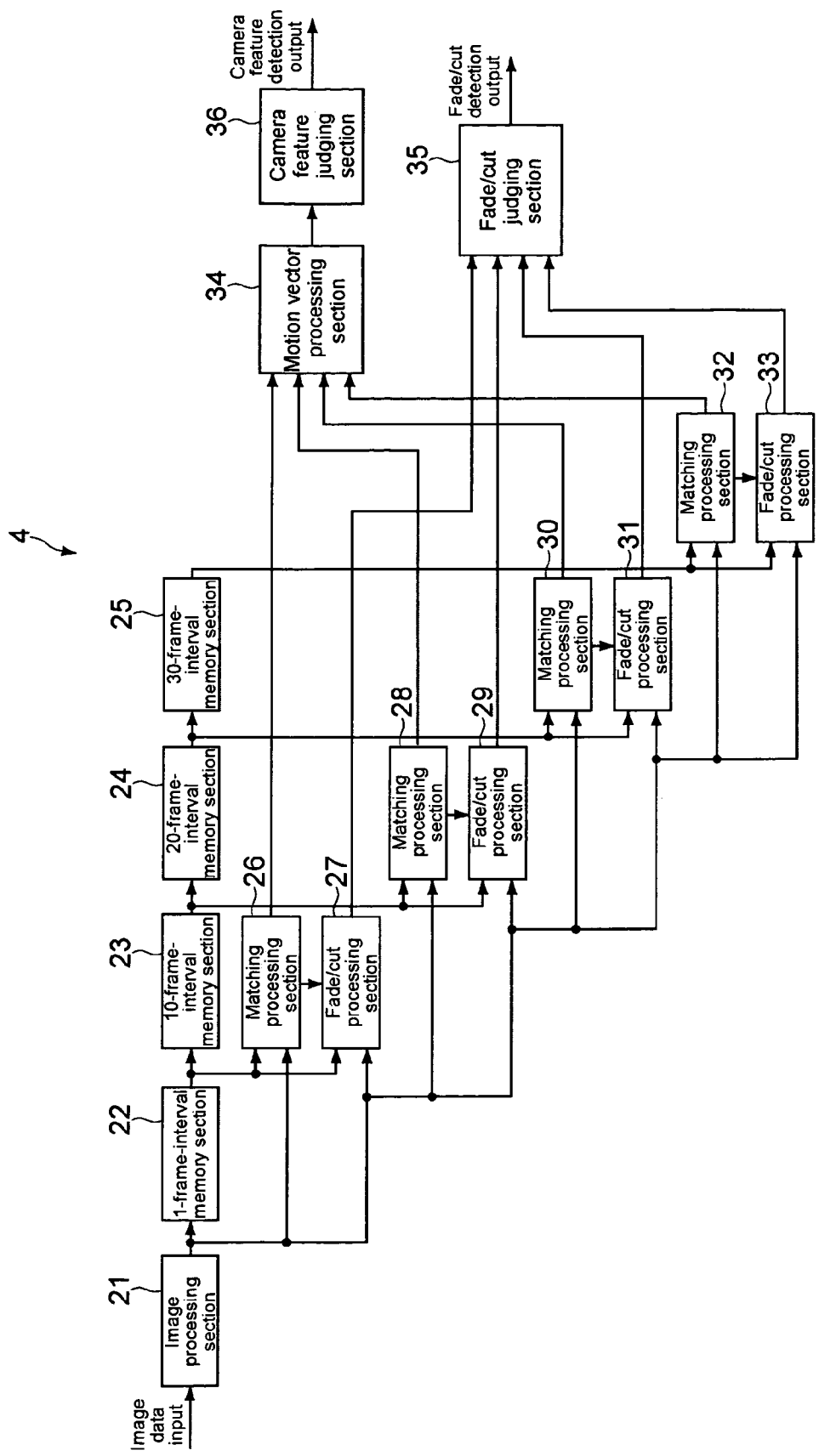
FIG. 7 is a diagram specifically showing a structure of a video feature detecting section according to the embodiment of the present invention.

FIG. 7 is a block diagram specifically showing a structure of the video feature detecting section 4.

As shown in the figure, the video feature detecting section 4 includes an image processing section 21, a 1-frame-interval memory section 22, a 10-frame-interval memory section 23, a 20-frame-interval memory section 24, a 30-frame-interval memory section 25, matching processing sections 26, 28, 30, and 32 for the respective memory sections, fade/cut processing sections 27, 29, 31, and 33 also provided for the respective memory sections, a motion vector processing section 34, a camera feature judging section 36, and a fade/cut judging section 35.

The image processing section 21 inputs in the order of frame numbers image data (specifically, luminance signal Y and color-difference signals Cb and Cr) of frames in a baseband bandwidth that are contained in the video content decoded by the AV decoder 16, and carries out, based on the image data, various types of processing such as setting of a reference image region on which motion vector detection is to be performed and a position as a basis for the motion vector detection (hereinafter, referred to as basis position), setting of a retrieval region of the motion vector, and extraction of a block as a basis for the block-matching processing (hereinafter, referred to as basis block), detailed processing of which will be described later.

It should be noted that the reason for carrying out the processing in the baseband bandwidth is that regarding the video contents to be reproduced in the recording/reproducing apparatus 100, there may coexist video contents in various formats, such as digitally recorded DV (Digital Video) format data, analog-recorded VHS (Video Home System) format data, and 8-mm format data in addition to MPEG format data, so video feature extracting processing from those video contents is carried out in a common signal processing system as much as possible.

The 1-frame-interval memory section 22, the 10-frame-interval memory section 23, the 20-frame-interval memory section 24, and the 30-frame-interval memory section 25 store pieces of image data within a range from a frame from which the basis block has been extracted (hereinafter, referred to as basis frame) to respective frames between which the basis frame has intervals of 1 frame, 10 frames, 20 frames, and 30 frames. The frame intervals are of course not limited thereto.

The matching processing sections 26, 28, 30, and 32 carry out the block-matching processing between the basis frame input from the image processing section 21 and a retrieval region of frames respectively input from the inter-frame memory sections 22 to 25 (hereinafter, referred to as retrieval frames), and output respective results to the motion vector processing section 34. The block-matching processing involves retrieving, while moving a block within the retrieval frame (hereinafter, referred to as retrieval block) that has the same shape as the basis block of the basis frame, a position at which a similarity degree becomes maximum between the basis block and the retrieval block. The matching processing sections 26, 28, 30, and 32 respectively output motion vector amounts (i.e., movement amounts and movement directions in X (horizontal) and Y (vertical) directions) from the basis position to the respective retrieved positions to the motion vector processing section 34. Further, the matching processing sections 26, 28, 30, and 32 output residual values of Y, Cb, and Cr between the basis block and the respective retrieval blocks to the fade/cut processing sections 27, 29, 31, and 33, respectively. The processing above will be described later in detail.

Based on the post-matching differential values respectively input from the matching processing sections 26, 28, 30, and 32, the fade/cut processing sections 27, 29, 31, and 33 respectively generate fade/cut evaluation values and output the values to the fade/cut judging section 35, detailed processing of which will be described later.

It should be noted that the fade/cut processing sections 27, 29, 31, and 33 may individually calculate the differential values obtained between the basis block input from the image processing section 21 and the retrieval blocks respectively input from the inter-frame memory sections 22 to 25 and used in the block-matching processing.

Based on the motion vector amounts obtained as a result of the block-matching processing and respectively input from the matching processing sections 26, 28, 30, and 32, the motion vector processing section 34 estimates a motion vector amount at a position between which the basis position has a frame interval of 30 frames or more like 40 frames, and outputs the estimated motion vector amount to the camera feature judging section 36, detailed processing of which will be described later.

Based on the estimated motion vector amount input from the motion vector processing section 34, the camera feature judging section 36 judges the camera operational features of pan, tilt, zoom, and shake within the video content by multiple regression analysis using an affine transformation model to be described later, and outputs the judgment result to the CPU 1, detailed processing of which will be described later.

Based on the fade/cut evaluation values respectively input from the fade/cut processing sections 27, 29, 31, and 33, the fade/cut judging section 35 judges the video editorial feature of fade or cut within the video content, and outputs the judgment result to the CPU 1.

Next, an operation of the recording/reproducing apparatus 100 thus structured will be described.

Figure 8:
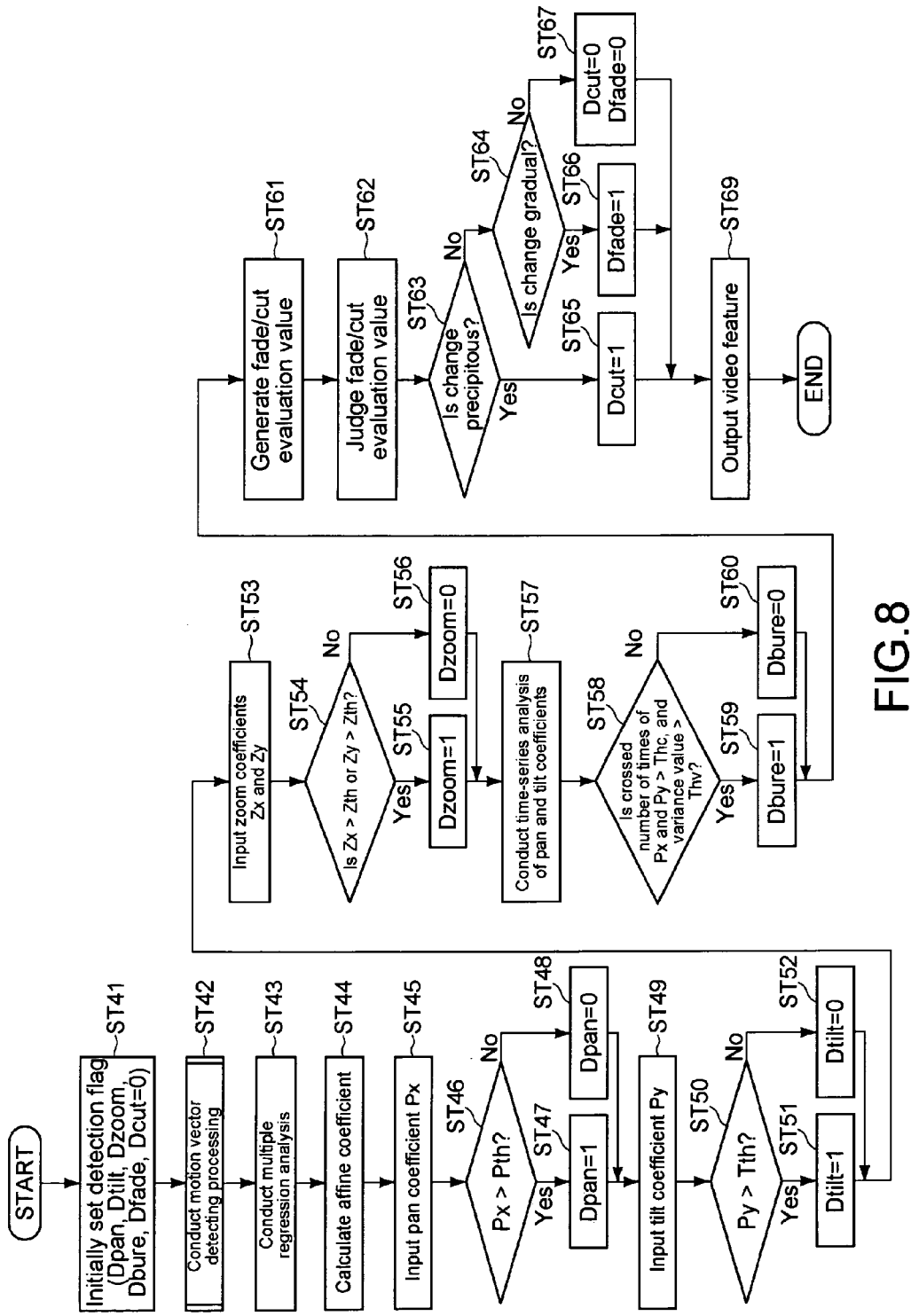
FIG. 8 is a flowchart showing a flow of processing that is carried out when a recording/reproducing apparatus judges a video feature according to the embodiment of the present invention.

FIG. 8 is a flowchart showing a flow of processing carried out when the recording/reproducing apparatus 100 detects video features.

As shown in the figure, the video feature detecting section 4 first performs initial settings of detection flags of the respective video features (Step 41). The detection flags respectively indicate that the camera operational features of pan, tilt, zoom, and shake and the video editorial features of fade and cut have been detected from the video content. The detection flags of the video features are respectively represented by Dpan, Dtilt, Dzoom, Dbure, Dfade, and Dcut, and flag values thereof are set to 0 in the initial settings.

Subsequently, the video feature detecting section 4 detects the motion vectors within the video content using the image processing section 21, the inter-frame memory sections 22 to 25, the matching processing sections 26, 28, 30, and 32, and the motion vector processing section 34 (Step 42).

Figure 9:
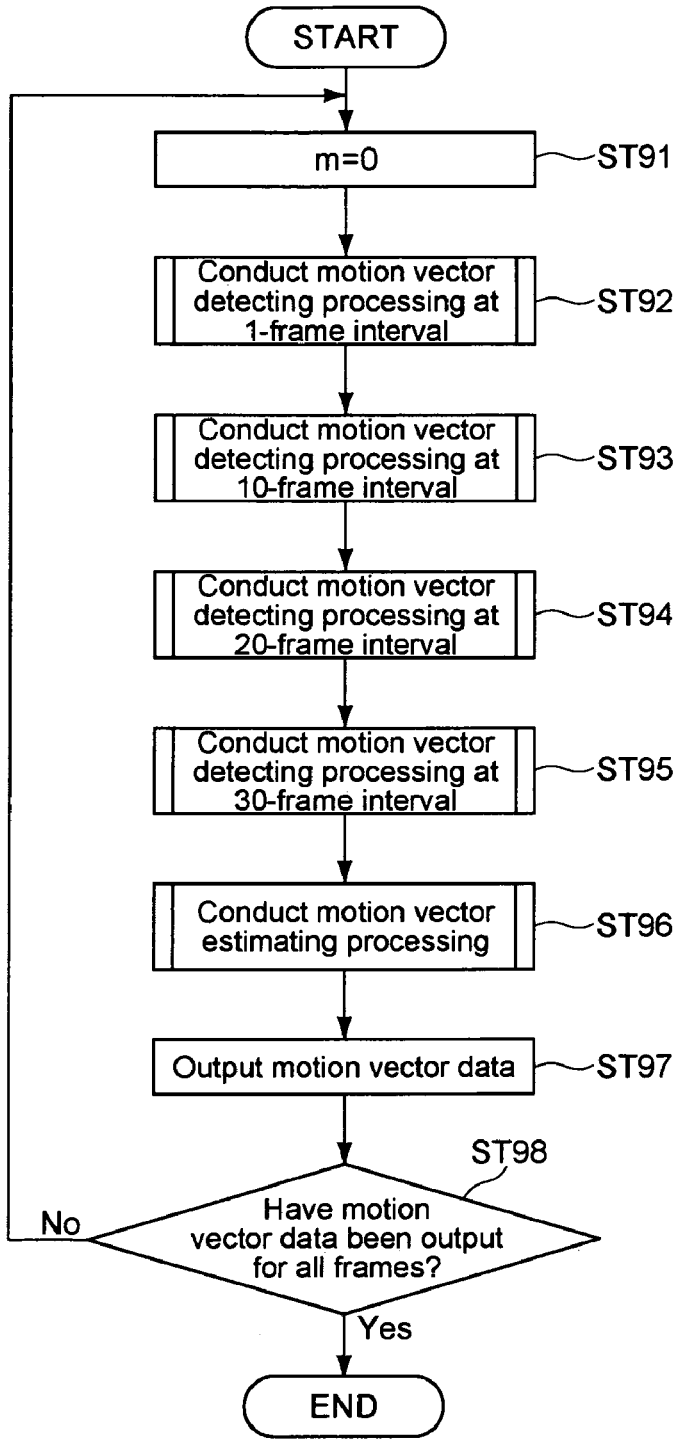
FIG. 9 is a flowchart showing a flow of motion vector detecting processing according to the embodiment of the present invention.

Now, descriptions will specifically be given on the motion vector detecting processing. FIG. 9 is a flowchart showing a flow of the motion vector detecting processing.

Incidentally, as described above, in the motion vector detecting processing, the motion vectors can be detected by setting a retrieval region in the retrieval frames between which the basis frame has respective predetermined frame intervals, and carrying out the block-matching processing between the basis frame and the respective retrieval regions. However, when the camera that has shot the video content is moved fast, for example, too long a frame interval probably leads to a frequent occurrence of motions in the video at that interval, thus degrading detection resolution performance and disabling accurate motion vector detection.

Further, when the camera is moved slowly, too short a frame interval causes an excessive decrease in detection value of the motion vector detected at that interval, thus disabling accurate motion vector detection also in this case.

In the above case where the camera is moved fast, the block corresponding to the basis block may move out of the retrieval region. However, it cannot be judged during the detection if the block corresponding to the basis block is still within the retrieval range or is outside the retrieval range.

Thus, in this embodiment, the video feature detecting section 4 estimates retrieval accuracy based on the movement amount at the detection points in the block matching and the residual values of the matching. When judged as inaccurate, the video feature detecting section 4 does not use the detection data thereof and uses only the accurate detection data, and estimates a motion vector amount at a longer frame interval based on the matching data at other frame intervals. Then, the video feature detecting section 4 uses the estimated motion vector amount as the motion vector amount to be used for detecting the video features.

As shown in FIG. 9, the video feature detecting section 4 first sets a counter value m indicating the number of accurate pieces of detection data to 0 (Step 91). The counter value m will be described later in detail.

Subsequently, the video feature detecting section 4 uses the basis frame input from the image processing section 21 and the retrieval frames respectively stored in the inter-frame memory sections 22 to 25 to carry out the motion vector detecting processing at the 1-frame interval, 10-frame interval, 20-frame interval, and 30-frame interval, respectively, (Steps 92 to 95) by the matching processing sections 26, 28, 30, and 32, detailed processing of which will be described later.

Next, based on the data of the motion vectors detected at the respective frame intervals, the video feature detecting section 4 uses the motion vector processing section 34 to estimate the motion vector at a 40-frame interval (Step 96), and outputs data on the estimated motion vector to the camera feature judging section 36 as final motion vector data (Step 97), detailed processing of which will be described later.

After that, the video feature detecting section 4 judges whether the motion vector data has been output for all the frames constituting a single video content, and repeats the processing of Steps 91 to 97 until the motion vectors are detected for all the frames (Step 98).

FIGS. 10 to 13 are flowcharts specifically showing processing of Steps 92 to 95, respectively, in FIG. 9 at the respective frame intervals in the motion vector detecting processing. First, descriptions will be given on the motion vector detecting processing at the 1-frame interval in Step 92.

Figure 10:
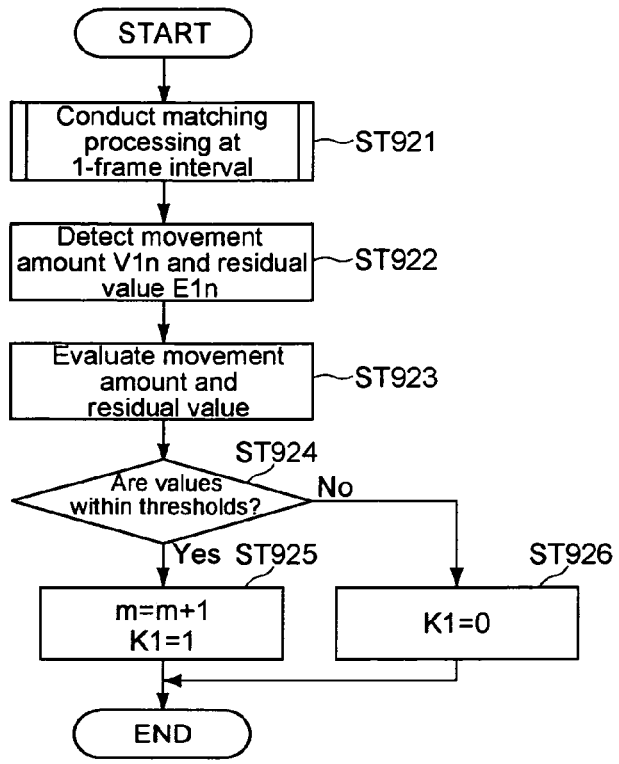
FIG. 10 is a flowchart specifically showing the motion vector detecting processing carried out at a 1-frame interval according to the embodiment of the present invention.

As shown in FIG. 10, first, the image processing section 21 and the matching processing section 26 carry out the block-matching processing between the basis frame and the retrieval frame between which the basis frame has the 1-frame interval (Step 921).

Figure 14:
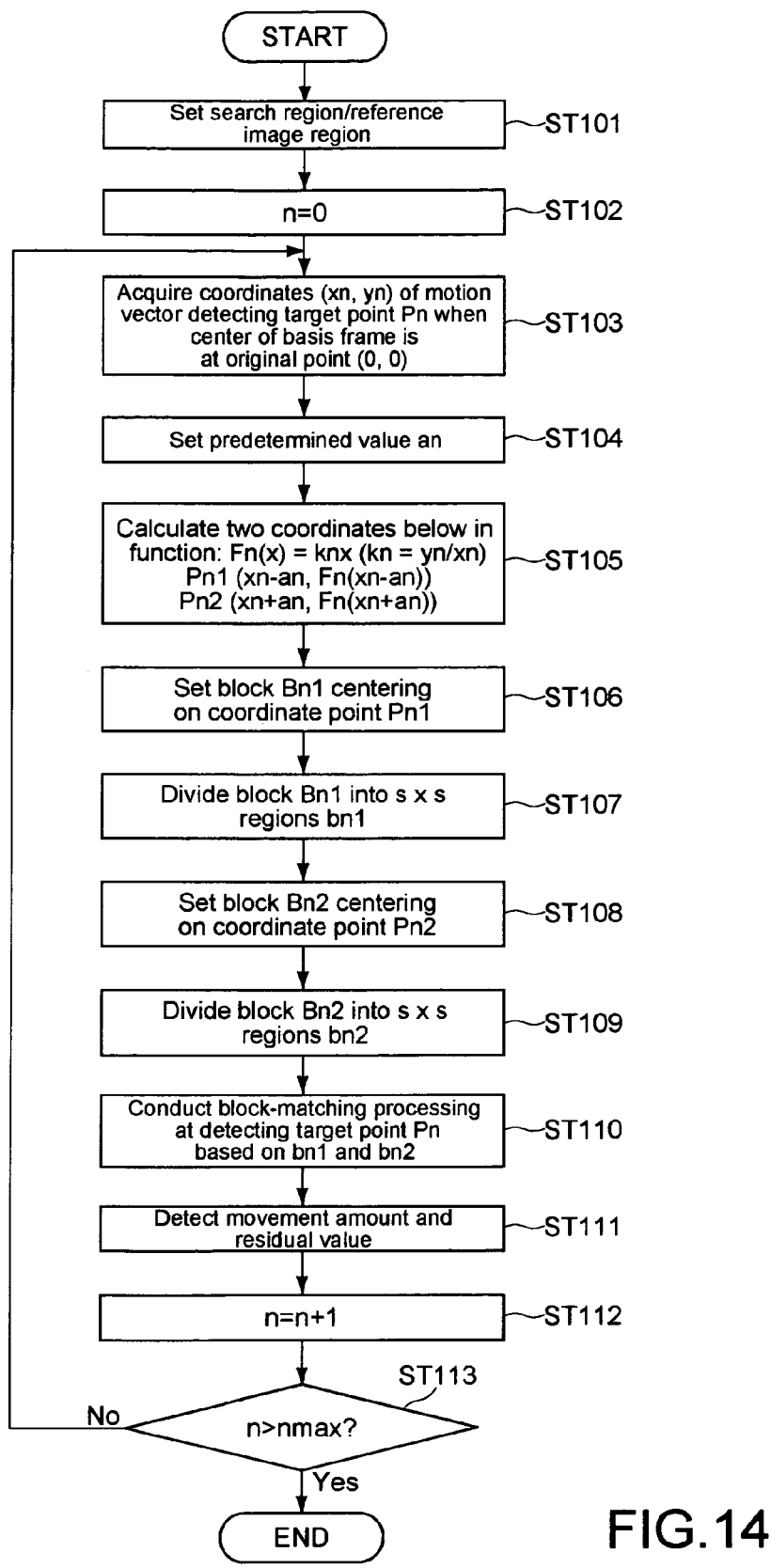
FIG. 14 is a flowchart showing a flow of block-matching processing according to the embodiment of the present invention.

Now, the block-matching processing will be described in detail. FIG. 14 is a flowchart showing a flow of the block-matching processing.

Figure 15:
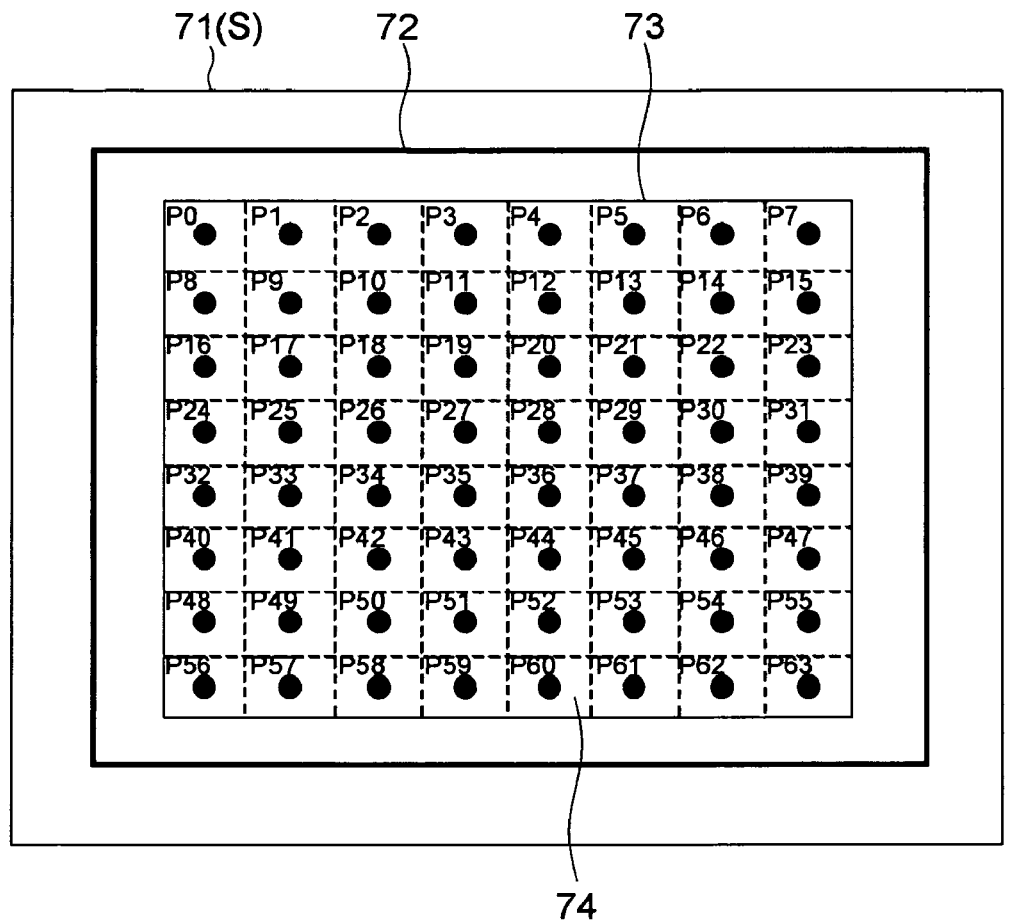
FIG. 15 is a diagram showing a state where a reference image region and a retrieval region are set according to the embodiment of the present invention.

As shown in the figure, the image processing section 21 first sets a reference image region and a retrieval region in the basis frame (Step 101). FIG. 15 is a diagram showing a state where the reference image region and the retrieval region are set.

As shown in the figure, the matching processing section 26 sets a retrieval region 72 that defines the retrieval range of the motion vector in a basis frame 71 as an original image (S), and sets a reference image region 73 inside the retrieval region 72 as a detecting target range of the motion vector.

Then, the matching processing section 26 divides the reference image region 73 into, for example, 8×8=64 regions 74, and sets a center point of each of the regions 74 as a motion vector detecting target point Pn (n=0 to 63).

It should be noted that a size of the basis frame 71 is, for example, 720×480 (pixels), but is not limited thereto. Moreover, the original image (S) may be a contracted image of the basis frame 71. For example, when the basis frame 71 has a size of 720×480 (pixels), an image having ¼ the size of the original image (S) (half the length in both longitudinal and lateral directions), that is, an image having a size of 360×240 (pixels) is set as the original image (S), and the retrieval region 72 and the reference image region 73 are set inside that image. Accordingly, loads on the matching processing sections 26, 28, 30, and 32 can be reduced without degrading precision in the later block-matching processing.

Referring back to FIG. 14, the image processing section 21 sets n of the motion vector detecting target point Pn to 0, and sets the basis block as a basis for the block-matching processing regarding P0 (Step 102). FIG. 16 are diagrams showing a method of setting a basis block.

As shown in the figures, the image processing section 21 first acquires coordinates (xn, yn) of the detecting target point Pn (P0 in this case) with the center of the basis frame 71 as an original point O (0, 0) (Step 103). Subsequently, the image processing section 21 sets a predetermined value an (Step 104). The value an is ½ the length of one side of the basis frame set as follows, for example. The value of an is set to, for example, 4, but is not limited thereto.

Then, as shown in FIG. 16A, with a function being set to Fn(x)=knx (kn=yn/xn) on the basis frame 71, the image processing section 21 calculates the following two coordinates of the function using the set value an (Step 105).

$$Pn1(xn-an, Fn(xn-an))$$

$$Pn2(xn+an, Fn(xn+an))$$

Subsequently, the image processing section 21 sets a basis block Bn1 centering on the coordinate point Pn1 (Step 106), and divides the basis block Bn1 into s×s small blocks bn1 (Step 107).

After that, the image processing section 21 sets a basis block Bn2 centering on the coordinate point Pn2 (Step 108), and divides the basis block Bn2 into s×s small blocks bn2 (Step 109).

As shown in FIG. 16B, when s=4, each of the basis blocks Bn1 and Bn2 is composed of small blocks b0 to b15. In addition, as shown in FIG. 16C, each of the small blocks bn1 and bn2 corresponds to an average value of, for example, four pieces of pixel data.

Here, assuming that the four pieces of pixel data are dn1, dn2, dn3, and dn4, each of the small blocks bn1 and bn2 can be treated as 3-dimensional vector data of Y, Cb, and Cr. When data components thereof are assigned with suffixes of _y, _cb, and _cr, respectively, the data components of the small block bn1, for example, can respectively be expressed by the following expressions.

$$bn1\_y=(dn1\_y+dn2\_y+dn3\_y+dn4\_y)/4$$

$$bn1\_cb=(dn1\_cb+dn2\_cb+dn3\_cb+dn4\_cb)/4$$

$$bn1\_cr=(dn1\_cr+dn2\_cr+dn3\_cr+dn4\_cr)/4$$

Upon completing setting of the basis blocks Bn1 and Bn2 as described above, the block-matching processing at the 1-frame interval, 10-frame interval, 20-frame interval, and 30-frame interval is started by the matching processing sections 26, 28, 30, and 32, respectively. It should be noted that hereinafter, descriptions will only be given on the block-matching processing carried out by the matching processing section 26 at the 1-frame interval, but the processing thereof is the same as those carried out by the matching processing sections 28, 30, and 32 at the respective frame intervals.

Figure 17A:
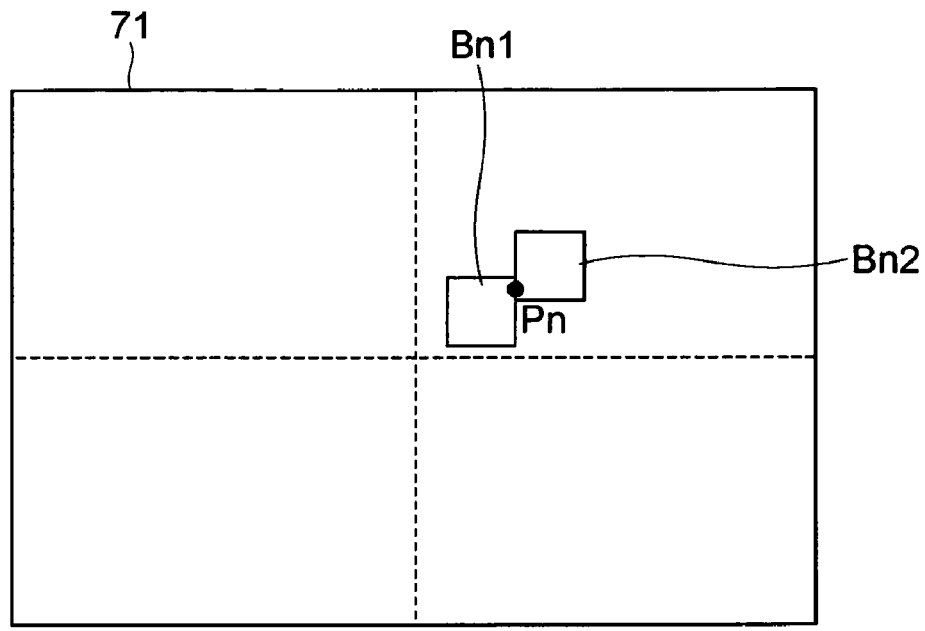
FIG. 17 are diagrams showing states of the block-matching processing according to the embodiment of the present invention.
Figure 17B:
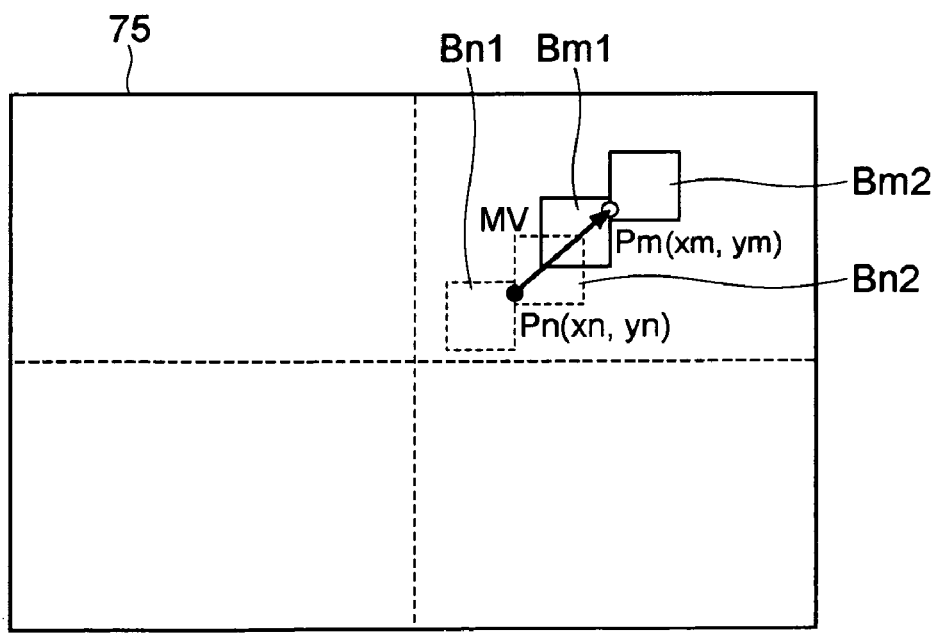

Based on the small blocks bn1 of the basis block Bn1 and the small blocks bn2 of the basis block Bn2, the matching processing section 26 carries out the block-matching processing (Step 110). FIG. 17 are diagrams showing a state where the block-matching processing is carried out. FIG. 17A shows the basis blocks Bn1 and Bn2 (hereinafter, the two basis blocks will also be collectively referred to as basis blocks Bn) in the basis frame 71, and FIG. 17B shows retrieval blocks Bm1 and Bm2 (hereinafter, the two retrieval blocks will also be collectively referred to as retrieval blocks Bm) in a retrieval frame 75.

As shown in the figures, the matching processing section 26 extracts the two set basis blocks Bn from the basis frame 71, and carries out pattern matching to detect a position to which the blocks corresponding to the basis blocks Bn have moved in the retrieval frame 75 between which the basis frame 71 has a predetermined frame interval (1-frame interval in this case). Specifically, the matching processing section 26 detects, while moving the retrieval blocks Bm one pixel at a time within the retrieval region 72 of the retrieval frame 75, a position Pm at which vector distances of the respective data components of Y, Cb, and Cr of each of the small blocks bn of the basis blocks Bn become minimum. A movement amount Vn and movement direction of the retrieval blocks Bm from the coordinate point Pn of the basis frame 71 to the detection position Pm thereof become a motion vector MV. Moreover, the matching processing section 26 also calculates a post-matching residual value between the basis blocks Bn and the retrieval blocks Bm together with the movement amount.

Upon completing the motion vector detection regarding the detecting target point Pn, the matching processing section 26 increments n by 1 (Step 112), and repeats the above processing until n becomes nmax or more (Step 113). In this embodiment, nmax is 63.

By the processing described above, the basis blocks Bn1 and Bn2 are set in the radial direction from the center of the basis frame 71. In other words, the basis blocks Bn1 and Bn2 are set so as to respectively center on points located on a half line that starts from the center of the basis frame 71. By thus setting the blocks in the radial direction, precision in detecting the motion vector especially in zooming among other camera operational features can be dramatically improved as described above. Further, by using a combination of two blocks for the block-matching processing, precision in detecting not only the motion vector in zooming, but also the motion vector in the X and Y directions, that is, in panning and tilting, can be improved as compared to the case of using a single block for the block-matching processing as in the related art.

The matching processing sections 28, 30, and 32 carry out the motion vector detection in the same manner as the matching processing section 26 using the retrieval frames 75 between which the basis frame 71 has the 10-frame interval, 20-frame interval, and 30-frame interval, respectively.

Here, as described above, in this embodiment, when the detected motion vector is judged as inaccurate, the video feature detecting section 4 does not use the detection data thereof for improving precision in detecting the motion vector. Hereinafter, as detailed descriptions of the processing, processing of Step 922 and the subsequent steps will be described while referring back to FIG. 10.

As described above, in addition to setting the retrieval region 72 for retrieving the motion vector, the matching processing section 26 also sets another retrieval range for improving precision in detecting the motion vector. This retrieval range is, for example, ±8 pixels in both the X and Y directions from the detecting target point Pn. Specifically, when judgment criteria are set such that the detection position Pm should be no more than 8 pixels away from the detecting target point Pn in a + or − direction and the post-matching residual value should be smaller than the predetermined threshold Eth, the matching processing section 26 does not use the detection data not satisfying the judgment criteria as being inaccurate data. The numerical value of the retrieval range is of course not limited to 8.

Here, movement amounts in the X (horizontal) and Y (vertical) directions in the motion vector detection at the 1-frame interval are respectively set as $V1xn$ and $V1yn$, and the residual value is set as $E1n$.

As shown in FIG. 10, the matching processing section 26 detects the movement amounts $V1xn$ and $V1yn$ and the residual value $E1n$ detected by the block-matching processing at the 1-frame interval (Step 922). Then, the matching processing section 26 judges, based on the judgment criteria, whether $|V1xn|<8,$ $|V1yn|<8,$ and $E1n<Eth$ are satisfied (Steps 923 and 924). When the values satisfy the judgment criteria, the matching processing section 26 sets an expedient weighting factor K1 to 1, and increments the counter value m indicating the number of accurate pieces of detection data by 1 (Step 925). On the other hand, when the values do not satisfy the judgment criteria, the matching processing section 26 sets K1 to 0 (Step 926). Then, the matching processing section 26 outputs, together with the detected movement amounts $V1xn$ and $V1yn$ and residual value $E1n$, the weighting factor K1 and the counter value m to the motion vector processing section 34.

Next, descriptions will be given on processing carried out after the block-matching processing in the motion vector detecting processing at the 10-frame interval. Here, the movement amounts in the X (horizontal) and Y (vertical) directions in the motion vector detection at the 10-frame interval are respectively set as $V10xn$ and $V10yn$, and the residual value is set as $E10n$.

Figure 11:
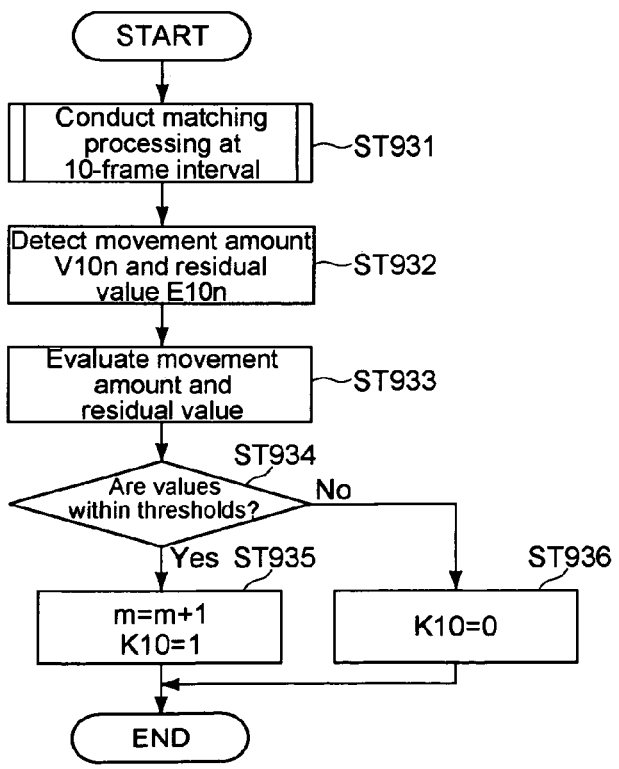
FIG. 11 is a flowchart specifically showing the motion vector detecting processing carried out at a 10-frame interval according to the embodiment of the present invention.

As shown in FIG. 11, the matching processing section 28 detects the movement amounts $V10xn$ and $V10yn$ and the residual value $E10n$ detected by the block-matching processing at the 10-frame interval (Step 932). Then, the matching processing section 28 judges, based on the judgment criteria, whether $|V10xn|<8,$ $|V10yn|<8,$ and $E10n<Eth$ are satisfied (Steps 933 and 934). When the values satisfy the judgment criteria, the matching processing section 28 sets an expedient weighting factor K10 to 1, and increments the counter value m indicating the number of accurate pieces of detection data by 1 (Step 935). On the other hand, when the values do not satisfy the judgment criteria, the matching processing section 28 sets K10 to 0 (Step 936). Then, the matching processing section 28 outputs, together with the detected movement amounts $V10xn$ and $V10yn$ and residual value $E10n$, the weighting factor K10 and the counter value m to the motion vector processing section 34.

Next, descriptions will be given on processing carried out after the block-matching processing in the motion vector detecting processing at the 20-frame interval. Here, the movement amounts in the X (horizontal) and Y (vertical) directions in the motion vector detection at the 20-frame interval are respectively set as $V20xn$ and $V20yn$, and the residual value is set as $E20n$.

Figure 12:
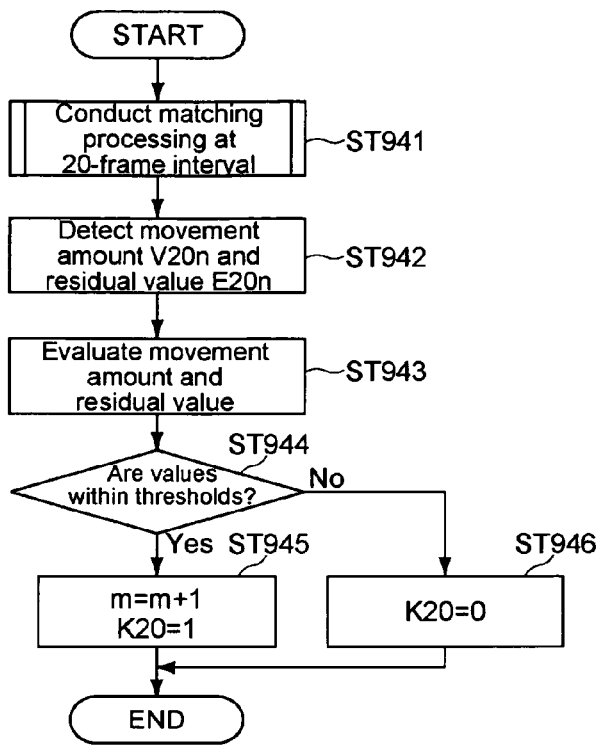
FIG. 12 is a flowchart specifically showing the motion vector detecting processing carried out at a 20-frame interval according to the embodiment of the present invention.

As shown in FIG. 12, the matching processing section 30 detects the movement amounts $V20xn$ and $V20yn$ and the residual value $E20n$ detected by the block-matching processing at the 20-frame interval (Step 942). Then, the matching processing section 30 judges, based on the judgment criteria, whether $|V20xn|<8,$ $|V20yn|<8,$ and $E20n<Eth$ are satisfied (Steps 943 and 944). When the values satisfy the judgment criteria, the matching processing section 30 sets an expedient weighting factor K20 to 1, and increments the counter value m indicating the number of accurate pieces of detection data by 1 (Step 945). On the other hand, when the values do not satisfy the judgment criteria, the matching processing section 30 sets K20 to 0 (Step 946). Then, the matching processing section 30 outputs, together with the detected movement amounts $V20xn$ and $V20yn$ and residual value $E20n$, the weighting factor K20 and the counter value m to the motion vector processing section 34.

Next, descriptions will be given on processing carried out after the block-matching processing in the motion vector detecting processing at the 30-frame interval. Here, the movement amounts in the X (horizontal) and Y (vertical) directions in the motion vector detection at the 30-frame interval are respectively set as $V30xn$ and $V30yn$, and the residual value is set as $E30n$.

Figure 13:
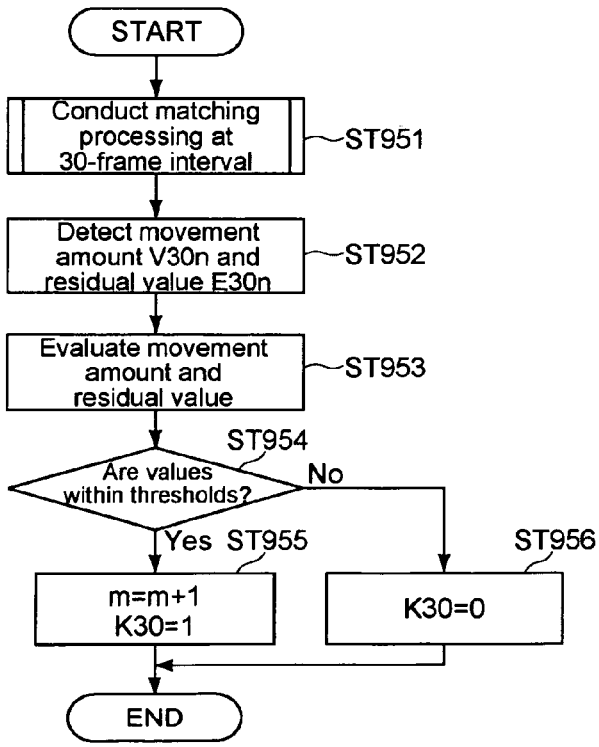
FIG. 13 is a flowchart specifically showing the motion vector detecting processing carried out at a 30-frame interval according to the embodiment of the present invention.

As shown in FIG. 13, the matching processing section 32 detects the movement amounts $V30xn$ and $V30yn$ and the residual value $E30n$ detected by the block-matching processing at the 30-frame interval (Step 952). Then, the matching processing section 32 judges, based on the judgment criteria, whether $$|V30xn|<8,$$

$$|V30yn|<8, \text{ and}$$

$$E30n<Eth$$

are satisfied (Steps 953 and 954). When the values satisfy the judgment criteria, the matching processing section 32 sets an expedient weighting factor K30 to 1, and increments the counter value m indicating the number of accurate pieces of detection data by 1 (Step 955). On the other hand, when the values do not satisfy the judgment criteria, the matching processing section 32 sets K30 to 0 (Step 956). Then, the matching processing section 32 outputs, together with the detected movement amounts V30xn and V30yn and residual value E30n, the weighting factor K30 and the counter value m to the motion vector processing section 34.

Figure 18:
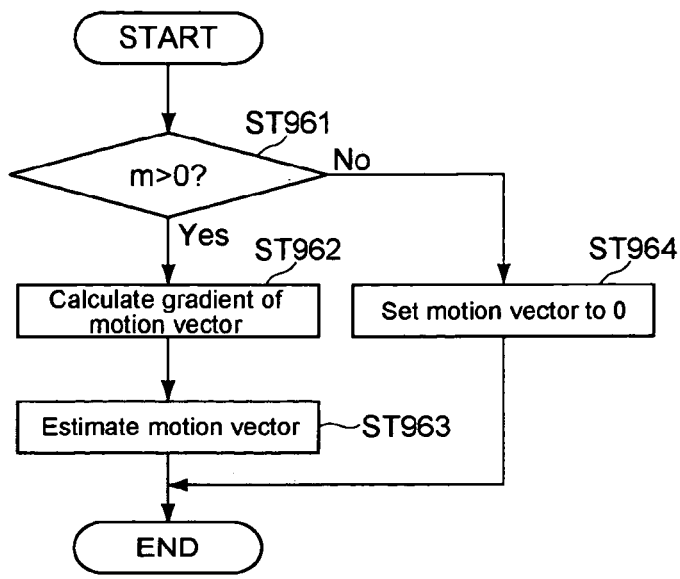
FIG. 18 is a flowchart showing a flow of motion vector estimating processing according to the embodiment of the present invention.
Figure 19:
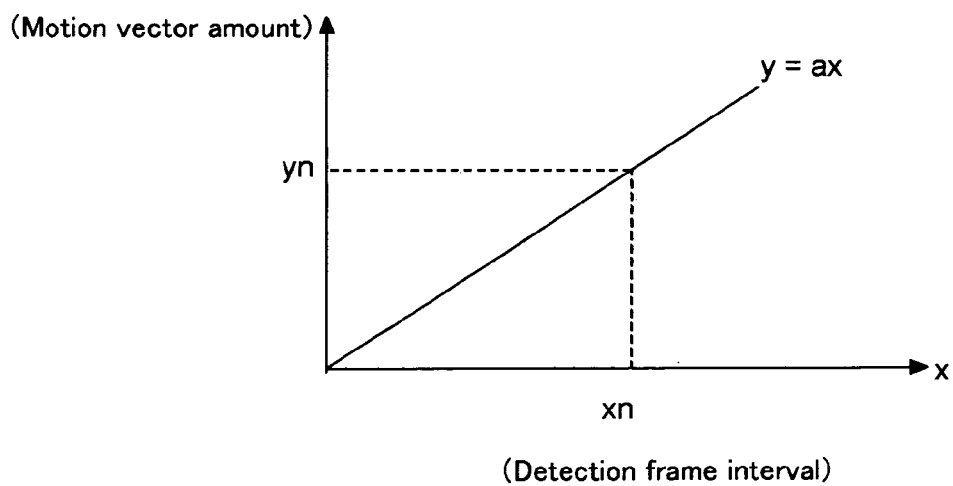
FIG. 19 is a diagram showing a gradient of a motion vector according to the embodiment of the present invention.

Next, descriptions will specifically be given on the motion vector estimating processing of Step 96 in FIG. 9 that is carried out by the motion vector processing section 34. FIG. 18 is a flowchart showing a flow of the motion vector estimating processing. Here, for estimating a motion vector at the 40-frame interval, an expedient gradient is calculated based on the respective detection frame intervals and movement amounts. FIG. 19 is a diagram showing the gradient.

As shown in FIG. 18, the motion vector processing section 34 first sums up the input counter values m respectively input from the matching processing sections 26, 28, 30, and 32, to judge whether the sum is equal to or larger than 1 (Step 961). When the sum of the counter values is equal to or larger than 1 (Yes), the motion vector processing section 34 calculates gradients of motion vectors at the respective frame intervals (Step 962).

Now, descriptions will first be given on a case where, based on an interval L1t (1-frame interval) and the movement amount V1xn, a gradient T1xn of the motion vector at the 1-frame interval is calculated.

The detection frame interval L1t is a ratio of a pts (Presentation Time Stamp) time interval p1t of the retrieval frame 75 that is 1 frame after the basis frame 71 to a pts time interval p0 of the basis frame 71. Thus, the detection frame interval L1t can be calculated using the following expression.

$$L1t=p1t/p0$$

This is because, since frame rates may differ from one another depending on video contents, the 1-frame-interval time is normalized when calculating the gradient.

Accordingly, the gradient regarding the movement amount in the X direction can be calculated using the following expression.

$$T1xn=V1xn/L1t$$

Moreover, the gradient regarding the movement amount in the Y direction can be calculated using the following expression.

$$T1yn=V1yn/L1t$$

Similarly, descriptions will be given on a case where, based on an interval L10t (10-frame interval) and the movement amount V10xn, a gradient T10xn of the motion vector at the 10-frame interval is calculated.

The detection frame interval L10t is a ratio of a pts time interval p10t of the retrieval frame 75 that is 10 frames after the basis frame 71 to the pts time interval p0 of the basis frame 71. Thus, the detection frame interval L10t can be calculated using the following expression.

$$L10t=p10t/p0$$

Accordingly, the gradient regarding the movement amount in the X direction can be calculated using the following expression.

$$T10xn=V10xn/L10t$$

Moreover, the gradient regarding the movement amount in the Y direction can be calculated using the following expression.

$$T10yn=V10yn/L10t$$

Similarly, descriptions will be given on a case where, based on an interval L20t (20-frame interval) and the movement amount V20xn, a gradient T20xn of the motion vector at the 20-frame interval is calculated.

The detection frame interval L20t is a ratio of a pts time interval p20t of the retrieval frame 75 that is 20 frames after the basis frame 71 to the pts time interval p0 of the basis frame 71. Thus, the detection frame interval L20t can be calculated using the following expression.

$$L20t=p20t/p0$$

Accordingly, the gradient regarding the movement amount in the x direction can be calculated using the following expression.

$$T20xn=V20xn/L20t$$

Moreover, the gradient regarding the movement amount in the Y direction can be calculated using the following expression.

$$T20yn=V20yn/L20t$$

Similarly, descriptions will be given on a case where, based on an interval L30t (30-frame interval) and the movement amount V30xn, a gradient T30xn of the motion vector at the 30-frame interval is calculated.

The detection frame interval L30t is a ratio of a pts time interval p30t of the retrieval frame 75 that is 30 frames after the basis frame 71 to the pts time interval p0 of the basis frame 71. Thus, the detection frame interval L30t can be calculated using the following expression.

$$L30t=p30t/p0$$

Accordingly, the gradient regarding the movement amount in the X direction can be calculated using the following expression.

$$T30xn=V30xn/L30t$$

Moreover, the gradient regarding the movement amount in the Y direction can be calculated using the following expression.

$$T30yn=V30yn/L30t$$

Thus, when a sum of the weighting factors (K1+K10+K20+K30) is larger than 0, average gradients Tavex(n) in the X direction and Tavey(n) in the Y direction can respectively be calculated using the following expressions.

$$Tavex(n)=(K1\times T1xn+K10\times T10xn+K20\times T20xn+K30\times T30xn)/(K1+K10+K20+K30)$$

$$Tavey(n)=(K1\times T1yn+K10\times T10yn+K20\times T20yn+K30\times T30yn)/(K1+K10+K20+K30)$$

Further, when (K1+K10+K20+K30) is 0, Tavex(n) and Tavey(n) can respectively be calculated using the following expressions.

$$Tavex(n)=0$$

$$Tavey(n)=0$$

Next, using the calculated average gradients, the motion vector processing section 34 estimates the motion vector at the 40-frame interval expediently (Step 963). Specifically, the motion vector processing section 34 can multiply the calculated average gradients by the frame interval to thus calculate the equivalent movement amount shown in FIG. 19. In other words, the estimated motion vector (estimated movement amount) at the 40-frame interval can be calculated for the X and Y directions using the following expressions.

$$40 \times Tavex(n)$$

$$40 \times Tavey(n)$$

It should be noted that in calculating the gradients, a straight line (y=ax) passing the original point as shown in FIG. 19 is expected in all the frame intervals. Thus, calculation values of the respective gradients are no more than approximate values.

The motion vector processing section 34 outputs the estimated motion vector to the camera feature judging section 36 as a motion vector obtained at the detecting target point Pn (Step 97 of FIG. 9). Furthermore, when the sum of the counter values m is 0 (No in Step 961), the motion vector processing section 34 sets the motion vector to 0 (Step 964) and outputs the value to the camera feature judging section 36 (Step 97 of FIG. 9). The output motion vector is used in the multiple regression analyzing processing to be described later.

As described above, because the judgment criteria are set so that detection data not satisfying the criteria, that is, inaccurate detection data is not used in detecting the motion vector, precision in detecting the motion vector can be improved. In addition, by estimating the motion vector at the frame interval longer than other detection frame intervals based on the detection data of the motion vectors at the respective frame intervals, the range of the detection data (dynamic range) can be expanded, thus improving data resolution performance as compared to the case of merely scaling the detection data.

Referring back to FIG. 8, the video feature detecting section 4 carries out the multiple regression analyzing processing by the camera feature judging section 36 based on the motion vector data output from the motion vector processing section 34 (Step 43), and calculates affine coefficients (Step 44). Now, descriptions will be given on the affine transformation model used for calculating the affine coefficients in the multiple regression analyzing processing.

FIG. 20 shows the affine transformation model. The affine transformation model is used for description of a parallel movement, enlargement/contraction, and rotation of a 3-dimensional object as coordinate transformation processing using a matrix. Because the camera operational features of pan, tilt, and zoom are considered as the parallel movement and enlargement/contraction of an object within the basis frame 71, the camera operational features can be described using the affine transformation model.

Here, when the frame interval is not large in the video content, the following approximating processing can be carried out assuming that a rotation angle θ is small regarding the rotational feature.

$$\sin \theta \approx \theta$$

$$\cos \theta \approx 1$$

Therefore, the affine transformation model can be transformed as shown in FIG. 20. In addition, the camera operational features can be detected by calculating the coefficients using the affine transformation model based on the detected motion vectors. Specifically, predetermined thresholds Pth, Tth, and Zth can respectively be set for pan, tilt, and zoom, and the affine coefficients processed from the detected motion vectors can be compared therewith, to thus detect the respective camera operational features.

FIG. 21 shows processing for calculating the affine coefficients by the multiple regression analysis. As shown in the figure, with explanatory variables as xy coordinates (xn, yn) at the detecting target point Pn in the basis frame 71 and explained variables (objective variables) as xy coordinates (xm, ym) at the motion vector detecting position Pm in the retrieval frame 75, the camera feature judging section 36 calculates coefficients Px, Py, and Zx of pan, tilt, and zoom, respectively, by carrying out the multiple regression analyzing processing (Step 44).

Referring back to FIG. 8, the camera feature judging section 36 inputs, from among the calculated affine coefficients, a pan coefficient Px (Step 45). Then, the camera feature judging section 36 judges whether Px is larger than the threshold Pth (Step 46). When Px is larger than Pth (Yes), the camera feature judging section 36 sets a pan detection flag Dpan to 1 (Step 47), and when equal to or smaller than Pth (No), sets the pan detection flag Dpan to 0 (Step 48).

Subsequently, the camera feature judging section 36 inputs, from among the calculated affine coefficients, a tilt coefficient Py (Step 49). Then, the camera feature judging section 36 judges whether Py is larger than the threshold Tth (Step 50). When Py is larger than Tth (Yes), the camera feature judging section 36 sets a tilt detection flag Dtilt to 1 (Step 51), and when equal to or smaller than Tth (No), sets the tilt detection flag Dtilt to 0 (Step 52).

Next, the camera feature judging section 36 inputs, from among the calculated affine coefficients, zoom coefficients Zx and Zy (Step 53). Then, the camera feature judging section 36 judges whether Zx or Zy is larger than the threshold Zth (Step 54). When at least one of Zx and Zy is larger than Zth (Yes), the camera feature judging section 36 sets a zoom detection flag Dzoom to 1 (Step 55), and when equal to or smaller than Zth (No), sets the zoom detection flag Dzoom to 0 (Step 56).

It should be noted that regarding the camera operational features of pan, tilt, and zoom, the camera feature judging section 36 may distinguishably detect each of leftward pan/rightward pan, leftward tilt/rightward tilt, and zoom in/zoom out. The distinction can easily be made by referring to signs of positive and negative of the respective affine coefficients.

Figure 22:
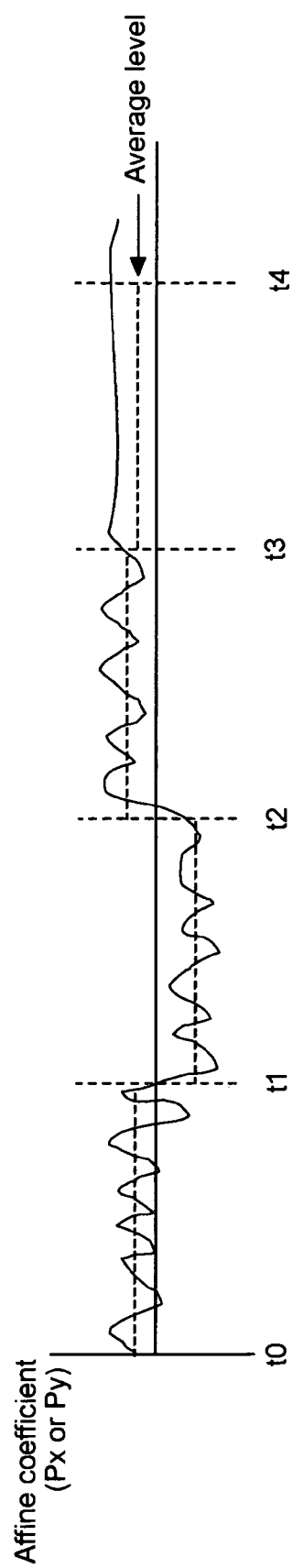
FIG. 22 is a diagram showing shake judging processing according to the embodiment of the present invention.

Subsequently, the camera feature judging section 36 carries out time-series analysis on the pan coefficient Px and the tilt coefficient Py to judge on shake caused by a hand movement (Step 57). FIG. 22 is a diagram showing the shake judging processing.

As shown in FIG. 22, the camera feature judging section 36 is capable of judging shake caused by a hand movement based on variances of the pan coefficient Px and the tilt coefficient Py that have been calculated from the affine coefficients for each of the predetermined sections (t0 to t1, t1 to t2, t2 to t3, and t3 to t4) within the video content, and the number of times Px or Py crosses an average value level in each of the predetermined sections. Each of the predetermined sections is set to a time length of, for example, about 0.5 sec to 5 sec.

For example, in the section t0 to t1 in the figure, Px or Py crosses the average value level 12 times. The camera feature judging section 36 judges whether the crossed number of times exceeds a threshold Thcr and a variance value of Px or Py in each of the predetermined sections is larger than a predetermined threshold Thv (Step 58).

Here, when the number of pieces of data of Px and Py for each of the predetermined sections is represented by N, the pieces of data are respectively represented by Px(n) and Px(y), and average values of those pieces of data are respectively represented by Pxave and Pyave, variance values Pxvari and Pyvari of Px and Py, respectively, can be calculated using the following expressions.

$$Pxvari=(1/N)/\Sigma((Pxave-Px(n))\times(Pxave-Px(n)))$$

$$Pyvari=(1/N)/\Sigma((Pyave-Py(n))\times(Pyave-Py(n)))$$

When either of the crossed number of times and the variance values are larger than the respective thresholds (Yes), the camera feature judging section 36 judges that a picture of the predetermined section is a shaking picture and sets a shake detection flag Dbure to 1 (Step 59). When at least one of the crossed number of times and the variance values is/are equal to or smaller than the corresponding threshold (No), the camera feature judging section 36 sets the shake detection flag Dbure to 0 (Step 60).

Next, the video feature detecting section 4 carries out fade and cut detecting processing.

First, descriptions will be given on processing carried out by the fade/cut processing sections 27, 29, 31, and 33.

The fade/cut processing sections 27, 29, 31, and 33 respectively input post-matching residual values E1n, E10n, E20n, and E30n from the matching processing sections 26, 28, 30, and 32, respectively, and output to the fade/cut judging section 35 fade/cut evaluation values generated based on those residual values (Step 61).

Here, when the residual values are each represented by En (n=0 to 63), a fade/cut evaluation value H can be calculated using the following expression.

$$H = \sum_{n=0}^{63} En$$

Therefore, the fade/cut processing sections 27, 29, 31, and 33 respectively input the residual values E1n, E10n, E20n, and E30n from the matching processing sections 26, 28, 30, and 32, respectively, until n reaches 63, that is, until residual values for all the detecting target points P0 to P63 of the basis frame 71 are input, and respectively calculate sums thereof.

Figure 23:
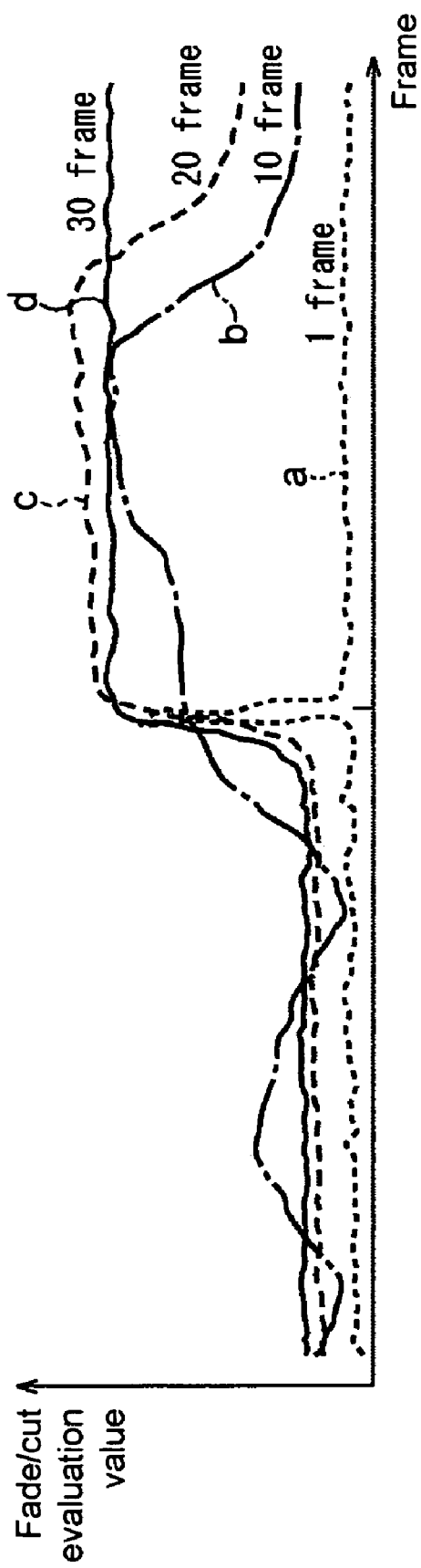
FIG. 23 is a graph showing a relationship between calculation results of a fade/cut evaluation value and elapse of frames regarding a case where a cut point is included according to the embodiment of the present invention.
Figure 24:
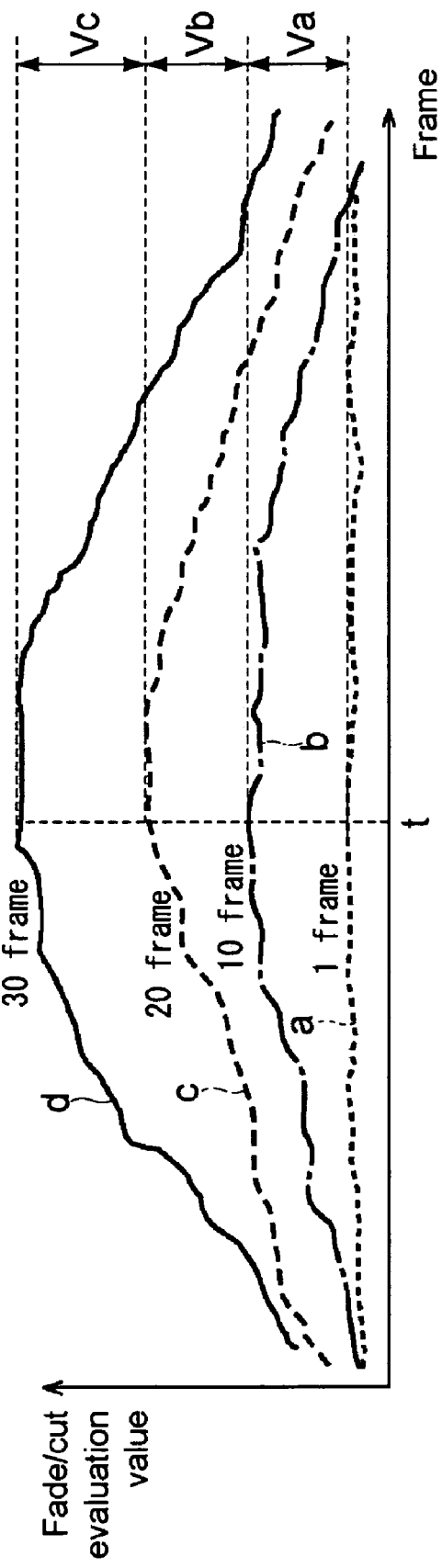
FIG. 24 is a graph showing a relationship between calculation results of the fade/cut evaluation value and elapse of frames regarding a case where fade is included according to the embodiment of the present invention.

FIGS. 23 and 24 are each a graph showing a relationship between a calculation result of the fade/cut evaluation value and elapse of a frame, for each frame interval. FIG. 23 is a graph of a case where a cut point is contained, and FIG. 24 is a graph of a case where fade is contained.

Based on the fade/cut evaluation values shown in FIGS. 23 and 24, the fade/cut judging section 35 carries out fade/cut judgment (Step 62). Specifically, when a change in fade/cut evaluation value accompanying the elapse of a frame is precipitous (Yes in Step 63), the fade/cut judging section 35 judges the change as a cut and sets a cut detection flag Dcut to 1 (Step 65). On the other hand, when the change in fade/cut evaluation value accompanying the elapse of a frame is gradual (Yes in Step 64), the fade/cut judging section 35 judges the change as fade and sets a fade detection flag Dfade to 1 (Step 66). When neither can be detected (No in Step 64), the fade/cut judging section 35 sets the cut detection flag Dcut and the fade detection flag Dfade to 0 (Step 67).

Specifically, the fade/cut judging section 35 analyzes the change in fade/cut evaluation value at the 1-frame interval, and when a peak characteristic as that shown in Graph a of FIG. 23 is detected, judges a peak point thereof as a cut point.

Further, when no peak characteristic is detected, as shown in FIG. 24, the fade/cut judging section 35 calculates, at a predetermined time t, a differential Va obtained between a fade evaluation value at the 1-frame interval (Graph a) and a fade evaluation value at the 10-frame interval (Graph b), a differential Vb obtained between the fade evaluation value at the 10-frame interval and a fade evaluation value at the 20-frame interval (Graph c), and a differential Vc obtained between the fade evaluation value at the 20-frame interval and a fade evaluation value at the 30-frame interval (Graph d).

In the case of fade as shown in FIG. 24, because the video gradually changes, change amounts of the fade/cut evaluation values are differed from one another depending on the frame intervals thereof. Thus, all values of Va, Vb, and Vc are notably expressed as positive numerical values relatively close to one another. On the other hand, in the case of cut as shown in FIG. 23, Va, Vb, and Vc may all be negative values largely differed from one another. Therefore, the fade/cut judging section 35 can detect the fade by analyzing Va, Vb, and Vc.

It should be noted that instead of inputting the post-matching residual values from the matching processing sections 26, 28, 30, and 32, respectively, as described above, the fade/cut processing sections 27, 29, 31, and 33 may individually calculate the fade/cut evaluation values using the basis blocks Bn input from the image processing section 21 and the retrieval blocks Bm respectively input from the inter-frame memory sections 22 to 25 and used in the block-matching processing. Specifically, the fade/cut processing sections 27, 29, 31, and 33 detect, for each detecting target point Pn, a differential between the basis blocks Bn and the retrieval blocks Bm for each piece of data on Y, Cb, and Cr, and respectively calculate a sum of the differentials for the detecting target points P0 to P63 as the fade/cut evaluation value. The differential in this case is calculated by comparing combined data of the basis blocks Bn1 and Bn2 and combined data of the retrieval blocks Bm1 and Bm2. However, using the post-matching residual values as described above naturally requires less load on the fade/cut processing sections 27, 29, 31, and 33.

FIG. 25 is a table showing judgment results of the respective video features judged by the camera feature judging section 36 and the fade/cut judging section 35. The CPU 1 carries out control so as to store data equivalent to the table in, for example, the RAM 2 or the HDD 10.

Figure 26:
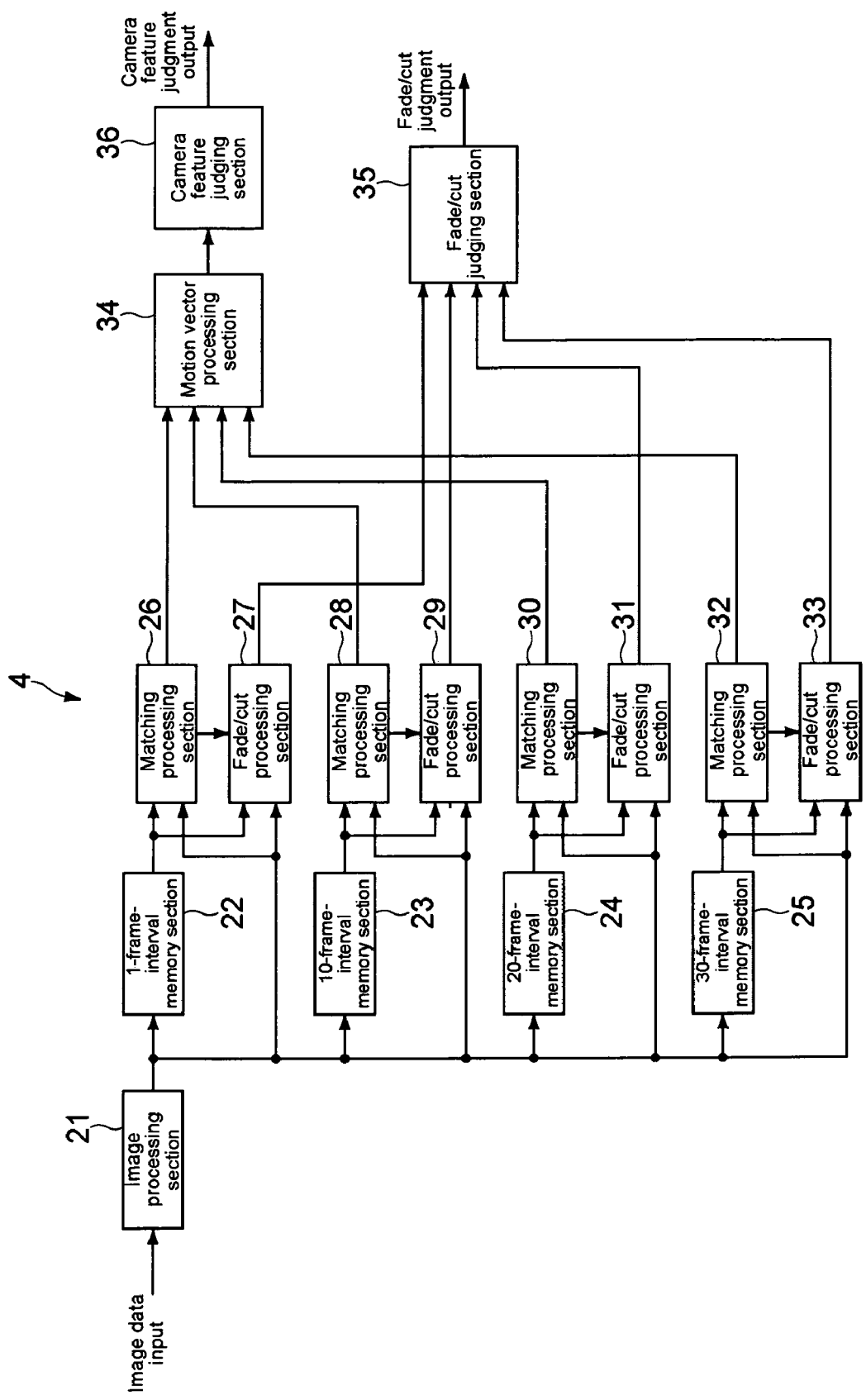
FIG. 26 is a diagram showing a specific structure of a video feature detecting section according to another embodiment of the present invention.

It should be noted that in FIG. 7, the video feature detecting section 4 is structured by connecting the inter-frame memory sections 22 to 25 in series. However, the video feature detecting section 4 may be structured by connecting the inter-frame memory sections 22 to 25 in parallel. FIG. 26 is a diagram showing a structure of the video feature detecting section 4 in this case. The thus structured video feature detecting section 4 executes the same processing as in the case where the inter-frame memory sections 22 to 25 are connected in series, and bears the same effect.

Next, descriptions will be given on processing of categorizing the video contents from which the video features have been detected as described above, in accordance with activity levels thereof.

Figure 27:
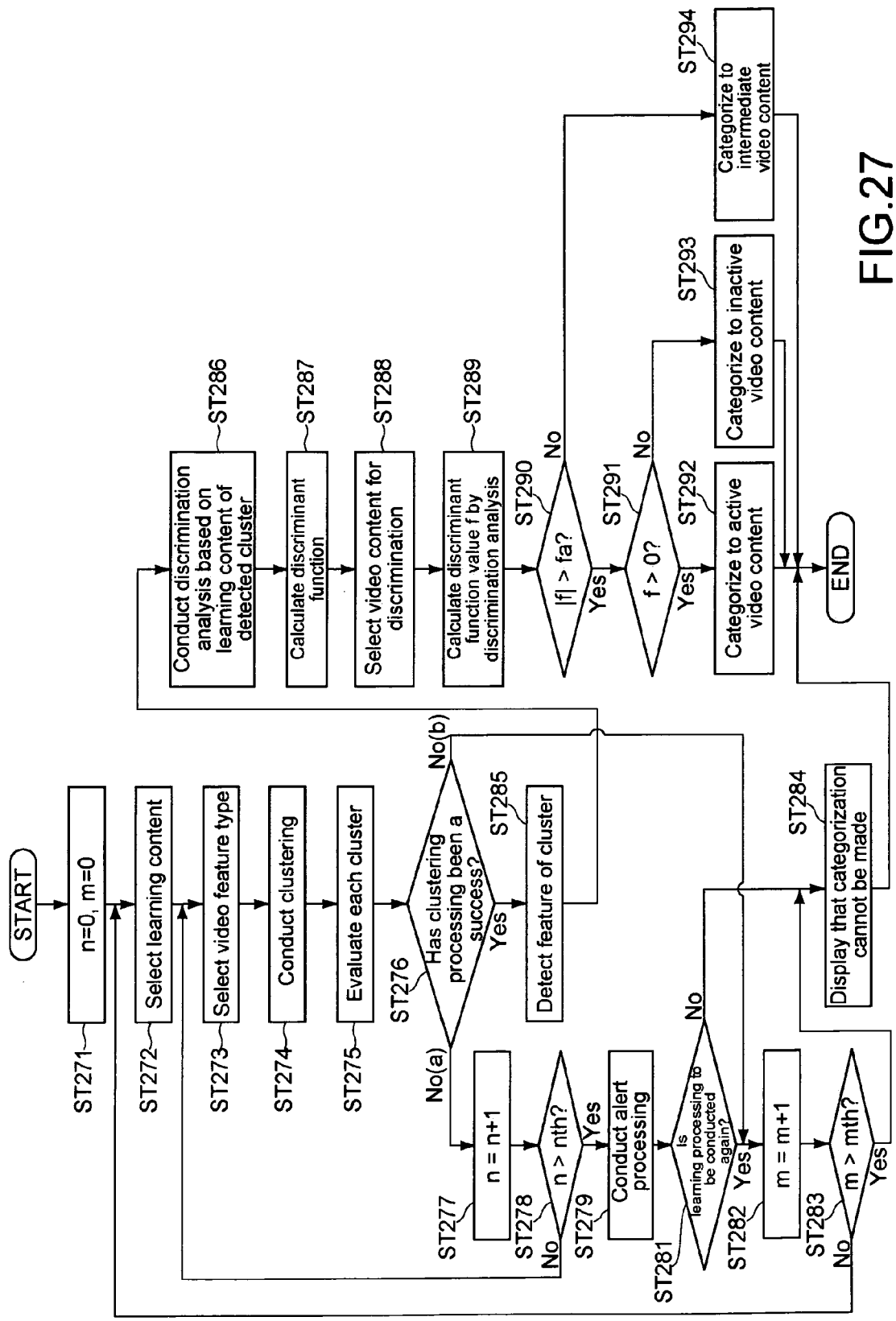
FIG. 27 is a flowchart showing a flow of processing carried out by the recording/reproducing apparatus according to the embodiment of the present invention to categorize video contents in accordance with activities.

FIG. 27 is a flowchart showing a flow of the processing carried out by the recording/reproducing apparatus 100 to categorize the video contents in accordance with the activity levels thereof.

As shown in the figure, the clustering processing section 20 first initializes counter values n and m that counts the number of execution times of the clustering processing as learning processing (Step 271). Then, the clustering processing section 20 selects learning video contents from the video contents stored in the HDD 10 (Step 272). As the learning contents, about 20% of the entire video contents are randomly selected, for example, but the ratio is of course not limited thereto. The counter values n and m are used for distinguishing the counter values in the processing in the case where the learning processing is executed using different learning contents. When first executing the learning processing after selecting the learning contents, the counter value n is set, and when executing the learning processing again after reselecting the learning contents thereafter, the counter value m is set.

Subsequently, the clustering processing section 20 selects video feature types to be a basis for the clustering of the selected learning contents (Step 273). The video feature type refers to the camera operational features of pan, tilt, and zoom and the video editorial features of fade and cut. The camera operational features of pan, tilt, and zoom indicate motions in video of the video content, and the more camera operational features there are, the more rushing the motions are in the video, meaning that the video content has a high activity. Moreover, the video editorial features of fade and cut indicate scene switches within the video content, and the more video editorial features there are, the more scene switches there are within the video content, meaning that the video content has a high activity. Therefore, the recording/reproducing apparatus 100 judges the activity of the video contents by using the video features.

Next, the clustering processing section 20 clusters the learning contents based on the selected video feature types. Specifically, the clustering processing section 20 carries out clustering based on, for example, respective mean values of the pan coefficients, the tilt coefficients, the zoom coefficients, and the fade/cut evaluation values within the entire video contents that have been calculated by the video feature detecting section 4 (hereinafter, will be referred to as video feature value). A K-means method is used as the clustering method, for example. When the K-means method is used, the number of clusters K is three, for example.

Subsequently, the clustering processing section 20 evaluates the clusters categorized by the clustering processing (Step 275) and judges whether the clustering processing has been a success (Step 276). For example, when K=3, a first cluster (active), a second cluster (inactive) having a totally different feature from the first cluster, and a third cluster having an intermediate feature of the first and second clusters are generated. The clustering processing section 20 detects the number of video contents belonging to each of the first to third clusters, and when a ratio of the number of video contents belonging to the third cluster with respect to the number of all the learning contents is a predetermined ratio (e.g., ⅓) or less, for example, determines that the clustering processing has been a success. Moreover, the clustering processing section 20 may determine that the clustering processing has been a success when the number of video contents belonging to the third cluster is smaller than the number of video contents belonging to each of the first and second clusters. The reason for making the determination as describe above is because, since the result of judging the activities by a discrimination analysis to be described later cannot be presented to the user effectively when the number of video contents belonging to the third cluster and having intermediate features is large, it is necessary to determine in advance whether the video contents can be categorized appropriately.

For example, in the case where the number of learning contents is 100, the clustering processing is determined to have been a success when the numbers of video contents belonging to the first to third clusters are 40, 40, and 20, respectively. When the numbers are 20, 20, and 60 in the stated order, the clustering processing is determined to have been a failure.

When determined in Step 276 that the clustering processing has been a failure (No(a)), the clustering processing section 20 increments the counter value n by 1 (Step 277) and determines whether the counter value n has exceeded a predetermined threshold nth (Step 278).

When determined in Step 278 that the counter value n has not exceeded the threshold nth (No), the clustering processing section 20 repeats the learning processing of Steps 273 to 275 again for the same video contents as the learning contents selected in Step 272. At this time, in Step 273, video feature types different in combination from the previously selected video feature types are selected. For example, when the video features of pan and tilt are selected in the last learning processing, at least one of the video feature types of pan and tilt is changed to at least one of the video feature types of zoom, fade, and cut in the current learning processing. Accordingly, it becomes possible to determine which video features should be used to appropriately categorize the video contents.

On the other hand, when determined in Step 278 that the counter value n has exceeded the threshold nth (Yes), the clustering processing section 20 causes a display to display an alert information indicating that the clustering processing has been a failure (Step 279), and prompts the user to select whether to carry out the learning processing again via the display (Step 281).

When selected by the user to carry out the learning processing again (Yes in Step 281), the clustering processing section 20 increments the counter value m by 1 (Step 282) and determines whether the counter value m has exceeded a predetermined threshold mth (Step 283).

When determined in Step 283 that the counter value m has not exceeded the threshold mth (No), the clustering processing section 20 reselects as the learning contents video contents different from the video contents selected as the learning contents in the last learning processing (Step 272), and repeats the processing of Steps 273 to 276 thereafter.

Also in this case, when determined in Step 276 that the clustering processing has been a failure (No(b)), the clustering processing section 20 increments the counter value m by 1 (Step 282) and repeats the processing of Steps 273 to 276 while changing the video feature types until the counter value m exceeds the threshold mth.

When determined that the clustering processing has been a failure in Step 276 and the counter value m has exceeded the threshold mth, the clustering processing section 20 causes the display to display that the learning contents cannot be categorized (Step 284) and ends the processing.

When determined in Step 276 that the clustering processing has been a success (Yes), the activity judging section 40 detects features in each of the categorized clusters (Step 285). Specifically, the activity judging section 40 refers to the video feature values of the video contents belonging to each of the clusters, for example, to detect features that are "active", "inactive", and "intermediate" in the respective clusters.

Then, the activity judging section 40 selects the learning contents belonging to the clusters respectively having the "active" and "inactive" features among the detected features of the clusters, and uses the video feature values of the learning contents belonging to the respective clusters to carry out a two-group discrimination analysis (Step 286). The activity judging section 40 thus calculates the discriminant function (coefficients for the discriminant function) (Step 287).

Subsequently, the activity judging section 40 selects, as a discrimination video content, video contents other than the learning contents (Step 288) and carries out the discrimination analysis using the calculated discriminant function based on the video feature values of the video contents, thereby calculating a discriminant function value f of the discrimination video contents (Step 289).

Next, the activity judging section 40 determines whether an absolute value |f| of each of the calculated discriminant function values f is larger than a predetermined threshold fa (Step 290).

When |f| is larger than the threshold fa (Yes), the activity judging section 40 next determines whether f is larger than 0 (Step 291).

When f>0, the activity judging section 40 categorizes the video contents as active video contents (Step 292).

On the other hand, when f<0, the activity judging section 40 categorizes the video contents as inactive video contents (Step 293).

Moreover, when determined that |f|≦fa in Step 290, the activity judging section 40 categorizes the video contents as intermediate video contents (Step 294).

The categorization results are associated with the respective video contents and stored in the HDD 10 or the like. It should be noted that the activity judging section 40 also judges and categorizes the activities by the discriminating processing afterwards with respect to the video contents used as the learning contents.

Figure 28A:
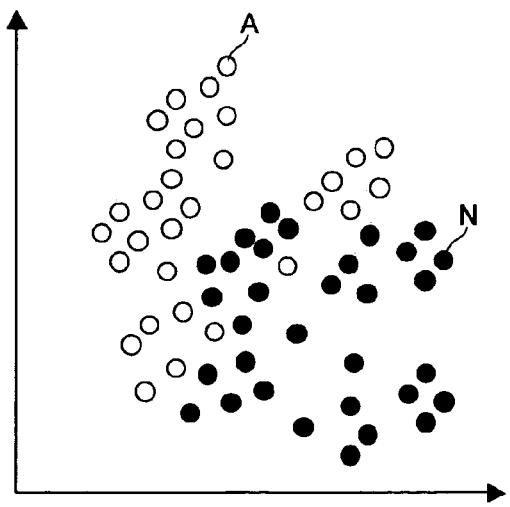
FIG. 28 are diagrams schematically showing video content categorizing processing carried out by an activity judging section.
Figure 28B:
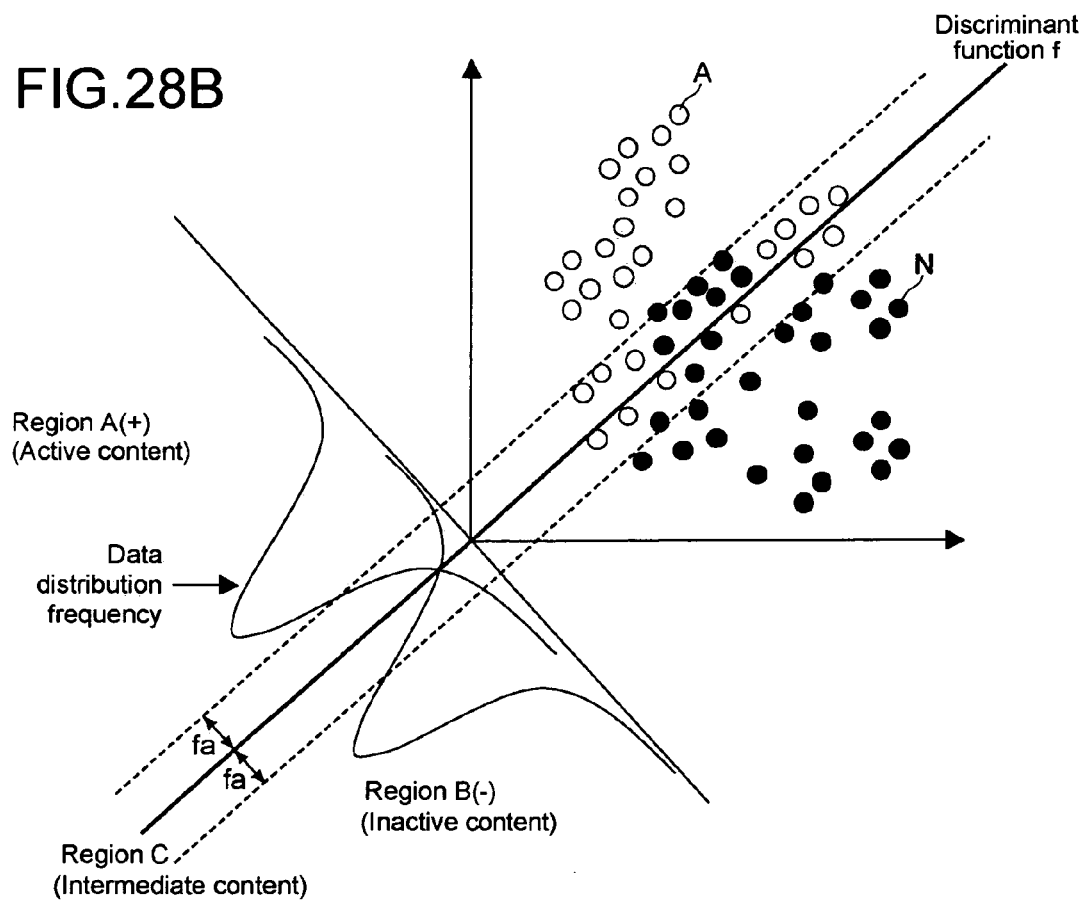

FIG. 28 are diagrams schematically showing the processing carried out by the activity judging section 40 to categorize the video contents. FIG. 28A shows a data distribution of the video feature values regarding the video contents not yet subjected to the categorizing processing, and FIG. 28B shows a state where the categorizing processing is carried out using the discrimination analysis with respect to the video contents that are distributed as shown in FIG. 28A.

As shown in FIG. 28A, active contents (A in the figure) and inactive contents (N in the figure) are present among the video contents. However, the recording/reproducing apparatus 100 is incapable of distinguishing one from the other in this state.

Thus, the discriminant function described above is calculated as shown in FIG. 28B. Using the discriminant function, the video contents in the data distribution are discriminated between, depending on whether a sign of the discriminant function value f is positive or negative, a region A to which the active video contents belong and a region B to which the inactive video contents belong. Moreover, among the regions A and B, a region C in the vicinity of the discriminant function, in which the absolute value |f| of the discriminant function value f becomes equal to or smaller than the threshold fa, is set as an intermediate region in which data frequencies of the regions A and B are small. In other words, the region C has characteristics of both the regions A and B and is considered as a region to which video contents having neither the active nor inactive video features, that is, video contents having intermediate video features belong.

As described above, the activity judging section 40 defines the regions A to C based on the discriminant function so that the video contents can be categorized into three categories.

Next, descriptions will be given on the method of presenting activities of the categorized video contents to the user.

In reproducing the video contents recorded onto the HDD 10, the recording/reproducing apparatus 100 causes the display to display a content list of the video contents to make the user select from the content list a video content that the user wishes to reproduce. By presenting the categorization result using the activities on the content list as activity identification information, the CPU 1 of the recording/reproducing apparatus 100 enables the user to select a video content in accordance with the activity thereof.

Figure 29:
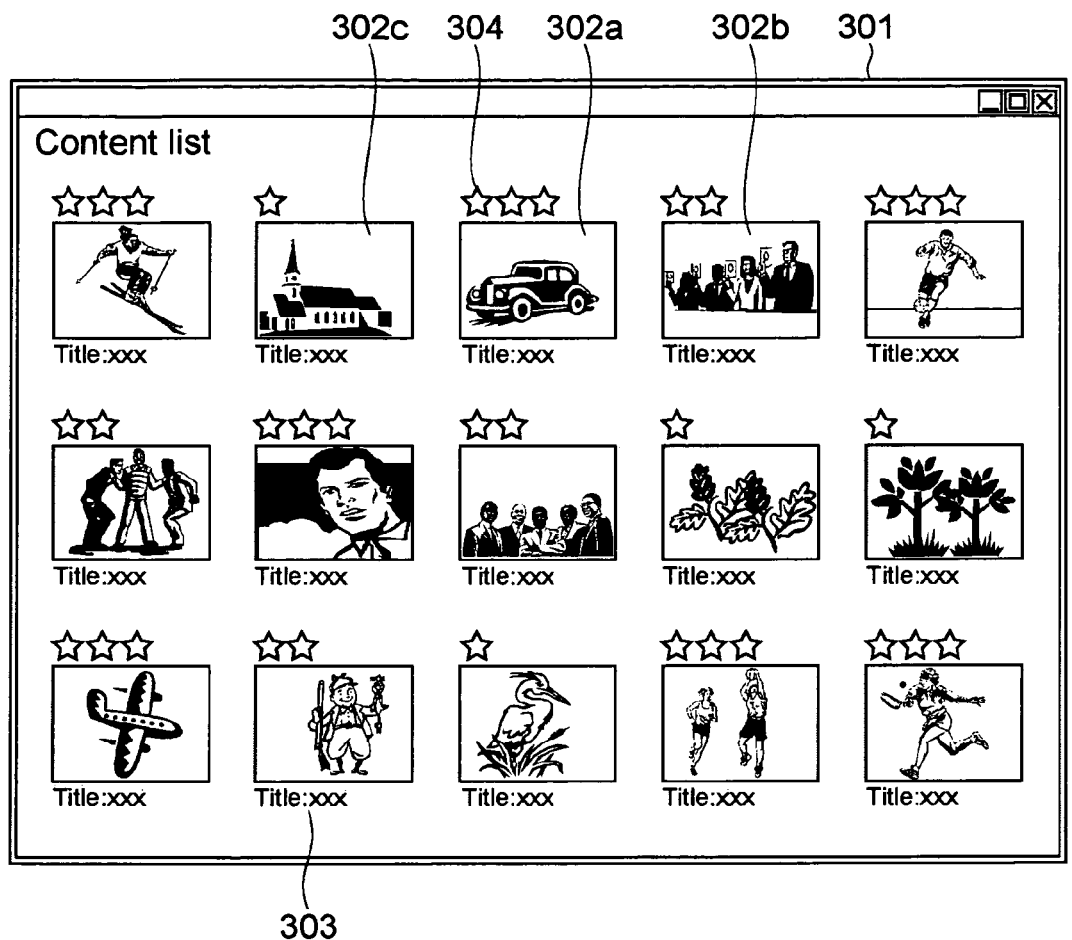
FIG. 29 is a diagram showing a display example of activity identification information in a content list.

FIG. 29 is a diagram showing a display example of the activity identification information on the content list.

As shown in the figure, thumbnail images 302 and title information 303 of the respective video contents are displayed in a matrix as the content list in a window 301, for example. In addition, the CPU 1 causes the display to display, on an upper portion of the thumbnail image 302 of each of the video contents, a star-shaped mark 304 as the activity identification information indicating a judged activity type among the three activity types. Three star-shaped marks 304 indicate an active video content, two star-shaped marks 304 indicate an intermediate video content, and one star-shaped mark 304 indicates an inactive content.

When wishing to view an active video content, the user only needs to select via the operation inputting section 3 the thumbnail image 302 of the video content having three star-shaped marks 304 displayed as the activity identification information. On the contrary, when wishing to view an inactive video content, the user only needs to select the thumbnail image 302 of the video content having one star-shaped mark 304 displayed. It should be noted that marks of other figures (symbols) including a circle and other polygonal shapes may be used instead of the star-shaped mark 304, or other images including characters may also be used instead.

Further, when the user wishes to view an inactive (e.g., calm) video content, the CPU 1 may cause the display to display, opposite to the case shown in the figure, three star-shaped marks 304 or the like as the activity identification information for the inactive video content and display one star-shaped mark 304 or the like as the activity identification information for the active video content. Furthermore, the CPU 1 may allow the user to customize an activity identification information displaying method in accordance with which of the active and inactive video contents the user is wishing to view.

Figure 30:
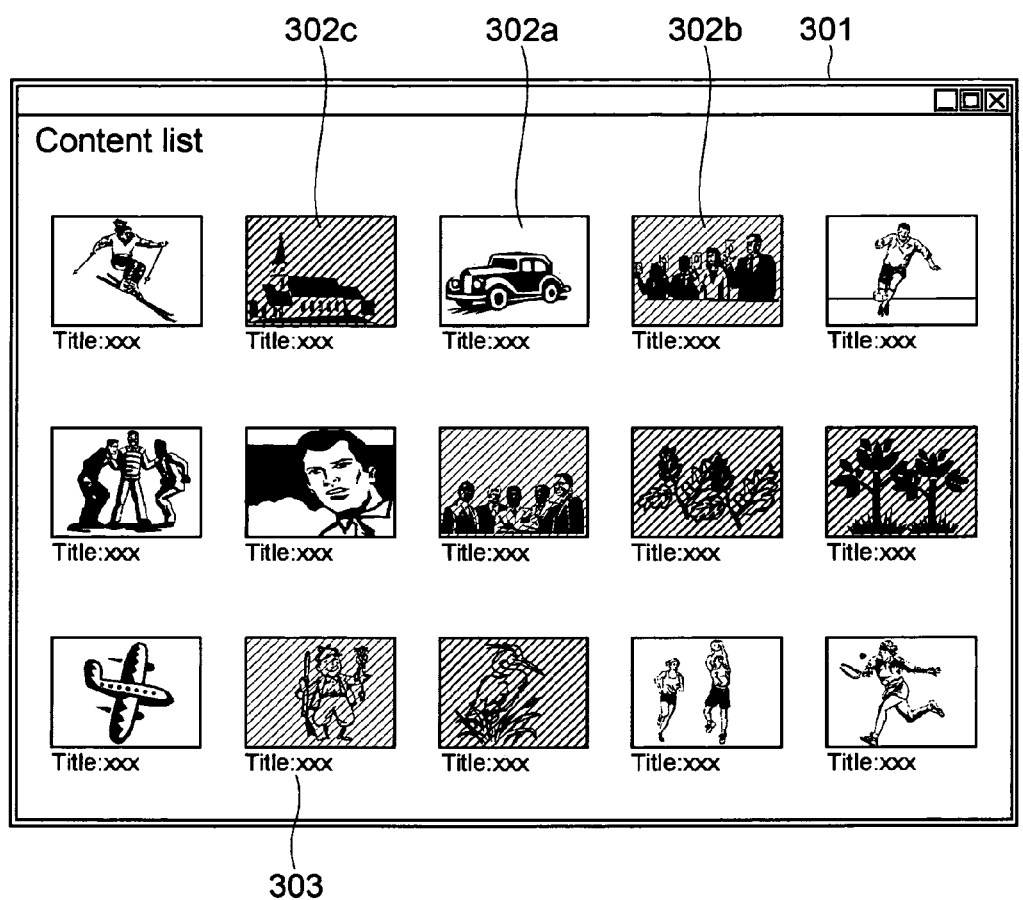
FIG. 30 is a diagram showing another display example of the activity identification information in the content list.

FIG. 30 is a diagram showing another display example of the content list. It should be noted that parts the same as that in FIG. 29 are denoted by the same reference symbols.

As shown in the figure, the CPU 1 may display the activity identification information as contrast information of the thumbnail image 302 in the content list. In the figure, the thumbnail image 302 of the active video contents is displayed brightly (e.g., thumbnail image 302a), the thumbnail image 302 of the intermediate video contents is displayed slightly darkly (e.g., thumbnail image 302b), and the thumbnail image 302 of the inactive video contents is displayed more darkly (e.g., thumbnail image 302c). This display can be realized by superimposing the thumbnail image and one of gray background images with a stepwise contrast in the OSD 17, for example.

Further, when the user is wishing to view an inactive video content, the CPU 1 may carry out control so that less active video contents are displayed to be brighter than those that are more active. Moreover, the CPU 1 may allow the user to customize which video content is to be displayed brightly.

Furthermore, instead of changing the contrast of the thumbnail images 302, the CPU 1 may identify activities by changing a color of the thumbnail images 302 or changing the color of only the outer frame of the thumbnail images 302. In the examples of FIGS. 29 and 30, the CPU 1 causes the activity identification information to be displayed distinguishably in three stages. However, the CPU 1 can also cause the activity identification information to be displayed distinguishably using more than three stages. This can be realized by the activity judging section 40 setting a plurality of thresholds fa in Step 290 of FIG. 27 and categorizing the video contents into four or more stages.

In addition, instead of indicating the activity of the contents stepwise (in discrete quantity), the CPU 1 may indicate the activity in a continuous quantity (in an analogue manner) as a ratio of the activity of each of the video contents with respect to a maximum value of the activity. This can be realized by the activity judging section 40 outputting the discriminant function value f in Step 289 of FIG. 27 as it is as information indicating the activity. Specifically, assuming that the discriminant function value f of −1 is a minimum value and f of 1 is a maximum value, the CPU 1 only needs to display the activities in the content list by converting the discriminant function value f of each of the video contents to a ratio thereof with respect to the maximum value 1.

Figure 31:
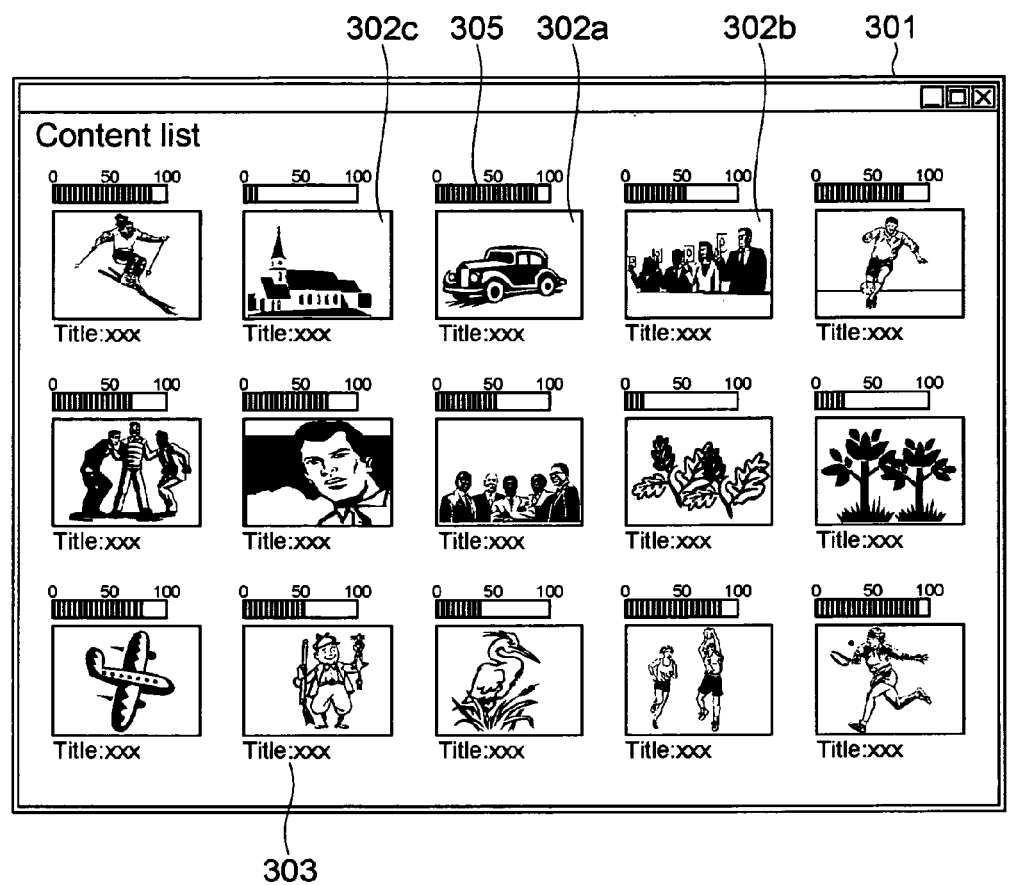
FIG. 31 is a diagram showing another display example of the activity identification information in the content list.

FIG. 31 is a diagram showing a display example of the activity identification information in the content list in this case. It should be noted that parts the same as that in FIGS. 29 and 30 are denoted by the same reference symbols.

As shown in the figure, the CPU 1 causes the activity identification information to be displayed in the content list as an image indicating a ratio of the activity with respect to the maximum value (ratio displaying image 305). In the figure, the ratio displaying image 305 is displayed as a bar graph (indicator). However, the ratio displaying image 305 may be displayed in other forms such as a pie graph. Further, the CPU 1 may cause the ratio to be displayed as a numerical value (text information) instead of objects such as graphs.

As described above, by presenting the activity of the video contents more specifically and in a continuous quantity (in an analogue manner), the selection range of the user can be widened.

In addition to displaying the activity identification information in the content list, the CPU 1 may allow the video contents to be retrieved (extracted) in accordance with the activities thereof.

For example, the CPU 1 may be allowed to extract a video content having a certain activity from the content list as shown in FIGS. 29 to 31.

Figure 32:
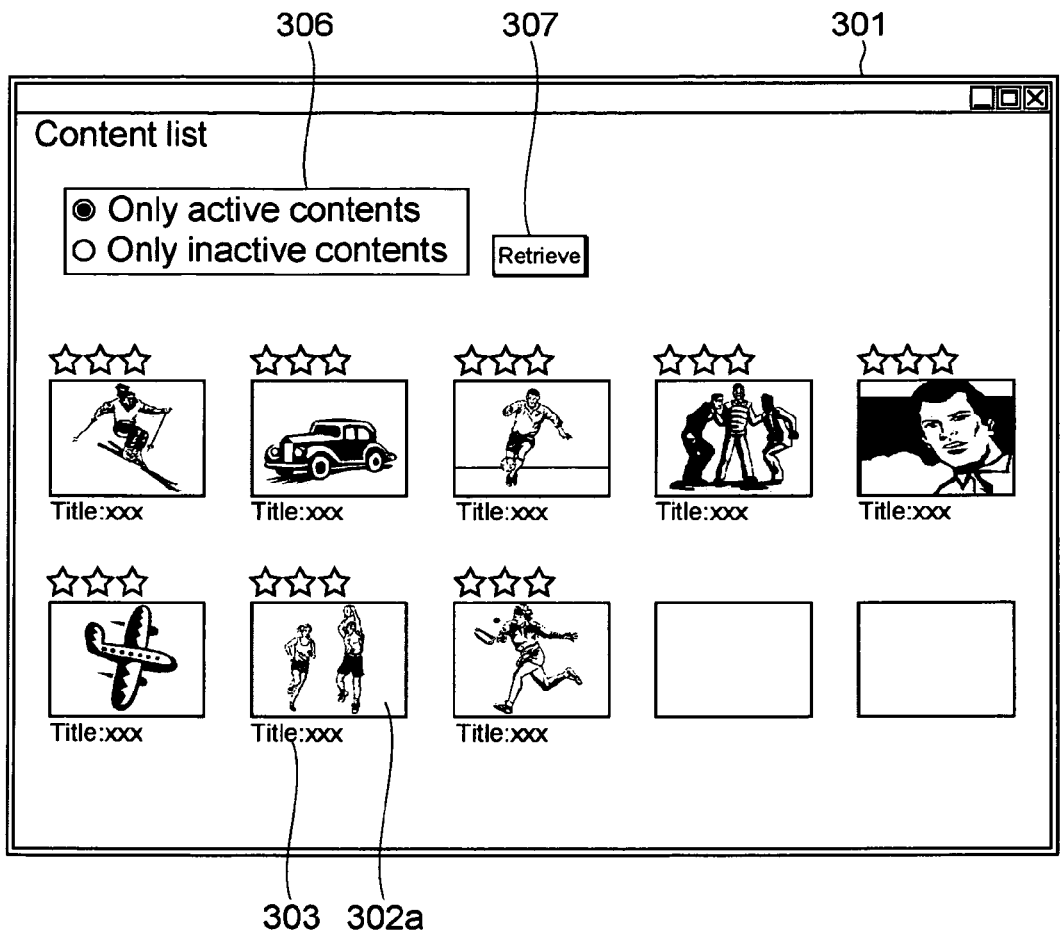
FIG. 32 is a diagram showing another display example of the activity identification information in the content list.

FIG. 32 is a diagram showing a display example of the content list in this case. As shown in the figure, a selecting box 306 and retrieval button 307 that enable selection of an activity type of either the active or inactive video content by, for example, a radio button are provided at an upper portion of the window 301. When the user selects the type of the video content using the radio button inside the selecting box 306 and presses the retrieval button 307, the video contents are narrowed down to only the video contents having the selected type of activity, and the thumbnail images 302 and title information 303 of those video contents are displayed inside the window 301. In the figure, when the active content is selected in the selecting box 306 and the retrieval button 307 is pressed, only the information on the active video contents are displayed. It should be noted that in the figure, the star-shaped mark is displayed as the activity identification information. However, any kind of activity identification information described above may be used instead.

In addition, the CPU 1 may be allowed to extract the video contents using a combination of the activity with other extraction items including a genre. For example, by extracting only the active contents from within the genre "sports", it becomes possible to extract, from among sports-related video contents, video contents that include more motions such as scoring scenes.

Further, when retrieving the video content using a keyword or the like, the CPU 1 may use the activity as one of the retrieval conditions (retrieval range) for the video contents.

Figure 33:
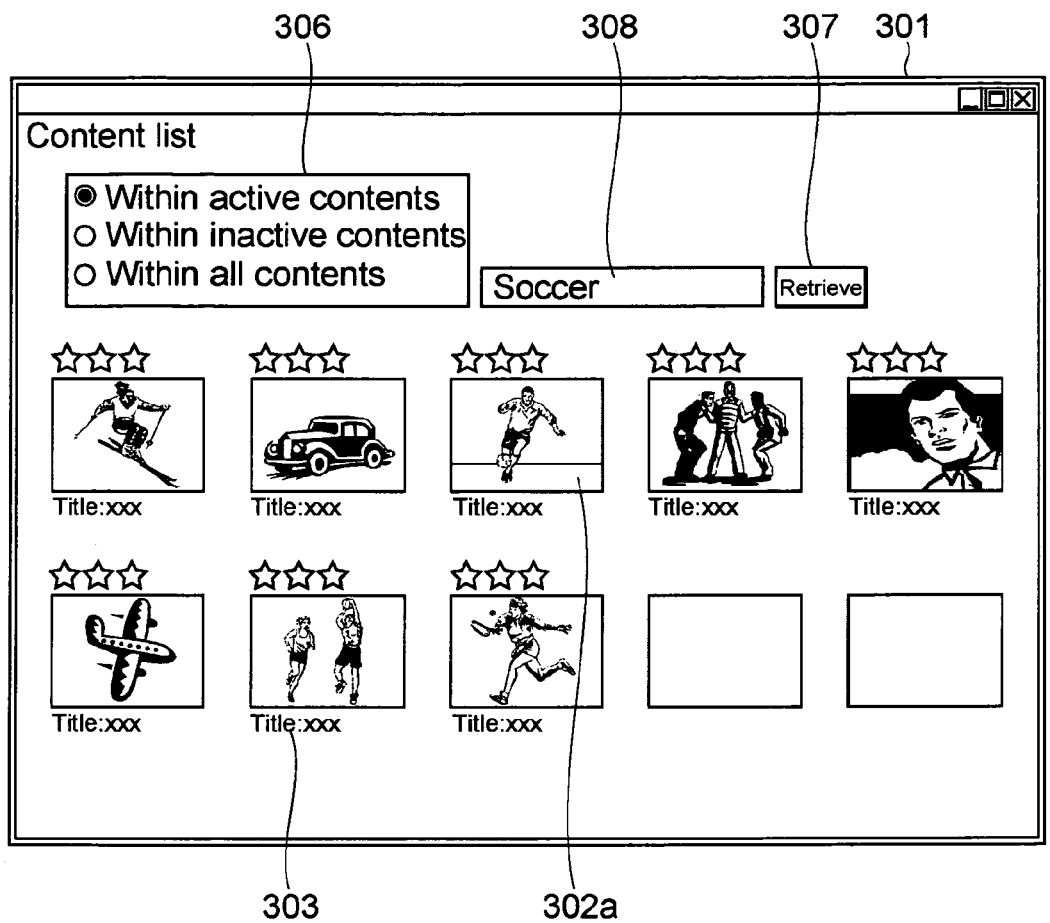
FIG. 33 is a diagram showing another display example of the activity identification information in the content list.

FIG. 33 is a diagram showing a display example of the content list in this case. As shown in the figure, the window 301 is provided with, at the upper portion thereof, the selecting box 306 that enables the user to select, from among the active video contents, inactive video contents, and all the video contents, video contents of which activity type are to be set as the retrieval range for the retrieval, an input box 308 used for inputting a retrieval keyword, and the retrieval button 307.

By the user selecting the type of the video contents to be set as the retrieval range in the selecting box 306, inputting a keyword in the input box 308 thereafter, and pressing the retrieval button 307, video contents that match the keyword are retrieved from the video contents of the type selected in the selecting box 306. FIG. 33 shows a state where the active video contents are selected as the retrieval range and a keyword "soccer" is input. When the retrieval button 307 is pressed in this state, the thumbnail image 302*a* and title information of the video contents containing soccer games are displayed as the retrieval result, for example.

By categorizing the video contents in accordance with activities thereof based on the video features of the respective video contents and presenting the mood of the respective video contents as the activity identification information, it becomes possible for the user to select a video content in accordance with his/her state of mind at that time.

The present invention is not limited to the above embodiment, and various modifications can of course be made without departing from the gist of the present invention.

In the above embodiment, the recording/reproducing apparatus 100 to which the present invention is applied has been exemplified. However, the present invention can be applied to various electronic apparatuses such as a television apparatus, a PC, a cellular phone, a game machine, a digital camera, and a camcorder.

Moreover, the present invention can be applied to a web server for providing video content posting sites on the Internet. In this case, at a stage where a predetermined number of video contents have been uploaded from client apparatuses such as PCs, the web server only needs to detect by the video feature detecting section 4 the video features of the video contents and select a part of the video contents as the learning video contents, carry out the clustering processing (learning processing) by the clustering processing section 20, and calculate by the activity judging section 40 the discriminant function based on the learned result to thus judge the activity of the video contents other than that of the learning video contents based on the discriminant function, as in the above embodiment. In this case, the activity judging section 40 may also judge the activity of the learning contents afterwards by the discrimination analysis, or the clustering processing section 20 may prepare the learning contents separate from the uploaded video contents.

For example, at a stage where 1,000 video contents are uploaded, the web server selects 200 video contents out of the 1,000 video contents as the learning contents, and judges the activity of the remaining 800 video contents. The numerical values are of course not limited thereto.

Further, the web server only needs to create a web page for displaying the uploaded video contents as the content list and carry out control so that, on a browser executed on a user PC as the client apparatus, one of various types of activity identification information as respectively shown in FIGS. 29 to 31 is displayed in content columns of the content list in accordance with the judged activities (transmission of a web page), for example.

User-posting-type video sites are expected to develop still further in the future and the number of video contents is also expected to increase. Thus, categorization of video contents in accordance with activities thereof and display of activity identification information greatly assist the user in selecting a video content.

In the above embodiment, the clustering processing section 20 uses the K-means method as the clustering method. However, other clustering methods such as a fuzzy C-means method and a ward method may be used instead. Further, instead of a so-called data clustering method, the clustering processing section 20 may use other categorizing methods such as a decision tree.

In the above embodiment, the activity judging section 40 judges the activity of the video contents by the discriminant function that uses a linear discriminant function. However, the activity judging section 40 may use a nonlinear discriminant function such as a Mahalanobis' generalized distance, or may judge the video contents by a multiple discrimination analysis using three categories of, for example, active, inactive, and intermediate.

Moreover, when the activity is presented stepwise like in 3, 4, or 5 stages, instead of carrying out the discrimination analysis, the activity judging section 40 may categorize the video contents by carrying out a cluster analysis similar to the learning processing by the clustering processing section 20 while changing the number of clusters K (e.g., K in the K-means method) if necessary.

In the above embodiment, the recording/reproducing apparatus 100 categorizes the video contents in accordance with the activities thereof. However, the recording/reproducing apparatus 100 may combine the categorizing processing of the video contents based on the activities and the categorizing processing of the video contents based on shake detected as the camera operational feature. For example, the recording/reproducing apparatus 100 may categorize, in accordance with whether the feature of shake caused by a hand movement is contained in the video content, the video contents into broadcasted video contents (including so-called IP broadcast) and private video contents shot by individuals such as users using home video cameras and the like, to thus enable additional filtering or categorization for display regarding the video contents that have been categorized based on the activities thereof based on which of the broadcasted content and the private content the video content is. Accordingly, when the user wishes to select, based on the activity, a video content from video contents of a high quality shot by professional cameramen, for example, video contents that do not match the user's purpose for viewing can be removed from the selection target, whereby time and effort required for the user to select a video content can be reduced.

In the above embodiment, the video feature detecting section 4 sets the plurality of basis blocks Bn radially. However, the video feature detecting section 4 may detect motion vectors using a single basis block without combining the plurality of basis blocks Bn radially, for example.

In the above embodiment, the video feature detecting section 4 judges the fade and cut by using the post-matching residual values as the fade/cut evaluation values. However, the video feature detecting section 4 may carry out judging processing using frequency analysis in addition to the judging processing using the fade/cut evaluation values.

Specifically, the fade/cut processing sections 27, 29, 31, and 33 carry out frequency analyzing processing through FFT (Fast Fourier Transform) processing, edge detecting processing, or the like, with respect to the basis frame 71 input from the image processing section 21 and the retrieval frames 75 respectively input from the inter-frame memory sections 22 to 25, and respectively output the results thereof to the fade/cut judging section 35. The fade/cut judging section 35 judges the fade and cut using both the fade/cut evaluation values and the results of the frequency analyzing processing. Because an image is made vague in the fade section, considering a frequency component, a feature with a high frequency component becomes small. Therefore, this feature can be used for judging the fade and cut.

In the above embodiment, the video feature detecting section 4 carries out the video feature detecting processing using the decoded signals of a baseband bandwidth of the respective frames of the video content. However, the video feature detecting section 4 may use pre-decoding encoded data instead of the decoded signals of the baseband bandwidth. For example, when the video content is encoded in the MPEG format or the DV format, instead of the signals of Y, Cb, and Cr, the video feature detecting section 4 can analyze a DC (Direct Current) coefficient from among DCT (Discrete Cosine Transform) coefficients to thus similarly detect the video features.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
    a detecting means for comparing each of a plurality of frames that constitute each of a plurality of video contents with one another, and detecting a video feature generated by one of a camera operation and video editing from each of the plurality of video contents; and
    a categorizing means for judging, based on the detected video feature, a visual activity level of a video contained in each of the plurality of video contents, and categorizing each of the plurality of video contents based on the judged activity level,
    wherein the categorizing means includes (i) learning means for categorizing learning video contents from among the plurality of video contents from which the video feature or features have been detected into a number of groups, and performing a learning operation thereon based on a ratio of the number of categorized learning video contents contained in each of the number of groups to a respective total number thereof, and (ii) judging means for judging the activity level based on a result of the learning operation.

2. The electronic apparatus according to claim 1, further comprising:
    a storing means for storing each of the plurality of video contents together with the judged activity level thereof, and
    an outputting means for outputting a signal for displaying a content list for inputting reproduction of each of the plurality of stored video contents together with identification information for identifying the judged activity level of each of the plurality of video contents.

3. The electronic apparatus according to claim 2, wherein the signal output by the outputting means causes a predetermined symbol in a number corresponding to the activity level to be displayed as the identification information.

4. The electronic apparatus according to claim 2, further comprising a retrieving means for retrieving a video content having a predetermined activity level, wherein the signal output by the outputting means causes the content list of video contents having the predetermined activity level and the identification information thereof to be displayed as a result of the retrieval.

5. An electronic apparatus, comprising:

a detecting means for comparing each of a plurality of frames that constitute each of a plurality of video contents with one another, and detecting a video feature generated by one of a camera operation and video editing from each of the plurality of video contents; and a categorizing means for judging, based on the detected video feature, a visual activity level of a video contained each of the plurality of video contents, and categorizing each of the plurality of video contents based on the judged activity level, wherein the detecting means is capable of detecting a plurality of kinds of video features, wherein the categorizing means includes:

a selecting means for selecting, from among the plurality of kinds of video features, at least one kind of video feature to be set as a basis for judging the activity level, and a judging means for judging the activity level of each of the plurality of video contents based on the selected video feature, wherein the selecting means includes a learning means for categorizing, for each of the plurality of kinds of video features, first video contents from among the plurality of video contents into a predetermined number of groups, and learning the video feature to be selected based on a ratio of the number of categorized first video contents contained in each of the predetermined number of groups, and wherein the judging means judges, from among the plurality of video contents, the activity level of second video contents other than the first video contents based on the selected video feature.

6. The electronic apparatus according to claim 5, wherein the detecting means detects each of the plurality of kinds of video features as a predetermined feature value, and wherein the judging means generates a predetermined discriminant function for discriminating, using the feature value of the video feature selected as a result of the learning as a variable, the second video contents between a video content whose activity level is high and a video content whose activity level is low, and judges the activity level based on a value of the discriminant function.

7. The electronic apparatus according to claim 6, wherein the judging means categorizes the second video contents into a plurality of levels in accordance with which of a positive value and a negative value the value of the discriminant function is and whether an absolute value of the value of the discriminant function exceeds at least one predetermined threshold.

8. An electronic apparatus, comprising:

a detecting means for comparing each of a plurality of frames that constitute each of a plurality of video contents with one another, and detecting a video feature generated by one of a camera operation and video editing from each of the plurality of video contents;

a categorizing means for judging, based on the detected video feature, a visual activity level of a video contained in each of the plurality of video contents, and categorizing each of the plurality of video contents based on the judged activity level;

a storing means for storing each of the plurality of video contents together with the judged activity level thereof; and an outputting means for outputting a signal for displaying a content list for inputting reproduction of each of the plurality of stored video contents together with identification information for identifying the judged activity level of each of the plurality of video contents, wherein the signal output by the outputting means causes an image indicating a ratio of the activity level with respect to a maximum activity level to be displayed as the identification information.

9. An electronic apparatus, comprising:

a detecting means for comparing each of a plurality of frames that constitute each of a plurality of video contents with one another, and detecting a video feature generated by one of a camera operation and video editing from each of the plurality of video contents;

a categorizing means for judging, based on the detected video feature, a visual activity level of a video contained in each of the plurality of video contents, and categorizing each of the plurality of video contents based on the judged activity level;

a storing means for storing each of the plurality of video contents ether with the judged activity level thereof; and an outputting means for outputting a signal for displaying a content list for inputting reproduction of each of the plurality of stored video contents together with identification information for identifying the judged activity level of each of the plurality of video contents, wherein the signal output by the outputting means causes a thumbnail image showing each of the plurality of video contents in a reproducible state to be displayed as the identification information while changing a contrast of the thumbnail image in accordance with the activity level of each of the plurality of video contents.

10. A content categorizing method, comprising:

comparing each of a plurality of frames that constitute each of a plurality of video contents with one another, and detecting a video feature generated by one of a camera operation and video editing from each of the plurality of video contents; and judging, based on the detected video feature, a visual activity level of a video contained in each of the plurality of video contents, and categorizing each of the plurality of video contents based on the judged activity level, wherein the judging and categorizing includes categorizing learning video contents from among the plurality of video contents from which the video feature or features have been detected into a number of groups, performing a learning operation thereon based on a ratio of the number of categorized learning video contents contained in each of the number of groups to a respective total number thereof, and judging the activity level based on a result of the learning operation.

11. An electronic apparatus, comprising:

a detecting unit for comparing each of a plurality of frames that constitute each of a plurality of video contents with one another, and detecting a video feature generated by one of a camera operation and video editing from each of the plurality of video contents; and a categorizing unit for judging, based on the detected video feature, a visual activity level of a video contained in each of the plurality of video contents, and categorizing each of the plurality of video contents based on the judged activity level, wherein the detecting unit is capable of detecting a plurality of kinds of video features, wherein the categorizing unit includes:

a selecting unit to select, from among the plurality of kinds of video features, at least one kind of video feature be set as a basis for judging the activity level, and a judging unit to judge the activity level of each of the plurality of video contents based on the selected video feature, wherein the selecting unit includes a learning unit to categorize, for each of the plurality of kinds of video features, first video contents from among the plurality of video contents into a predetermined number of groups, and learn the video feature to be selected based on a ratio of the number of categorized video contents contained in each of the predetermined number of groups, and wherein the judging unit judges, from among the plurality of video contents, the activity level of second video contents other than the first video contents based on the selected video feature.

* * * * *